(12) United States Patent
Murata et al.

(10) Patent No.: US 9,568,996 B2
(45) Date of Patent: Feb. 14, 2017

(54) IMAGE DISPLAY DEVICE AND DISPLAY CONTROL METHOD FOR IMAGE DISPLAY DEVICE

(71) Applicant: Seiko Epson Corporation, Tokyo (JP)

(72) Inventors: Akihiro Murata, Hokuto (JP); Toshiki Saito, Matsumoto (JP)

(73) Assignee: Seiko Epson Corporation (JP)

( * ) Notice: Subject to any disclaimer, the term of this patent is extended or adjusted under 35 U.S.C. 154(b) by 92 days.

(21) Appl. No.: 14/175,069

(22) Filed: Feb. 7, 2014

(65) Prior Publication Data

US 2014/0225920 A1 Aug. 14, 2014

(30) Foreign Application Priority Data

Feb. 13, 2013 (JP) .................................. 2013-025273

(51) Int. Cl.
G09G 5/00 (2006.01)
G06F 3/01 (2006.01)
G06T 3/20 (2006.01)
G06F 1/16 (2006.01)
G06T 19/00 (2011.01)
G06T 11/00 (2006.01)
(Continued)

(52) U.S. Cl.
CPC ............ *G06F 3/012* (2013.01); *G02B 27/0093* (2013.01); *G02B 27/017* (2013.01); *G06F 1/163* (2013.01); *G06T 11/00* (2013.01); *G06T 19/006* (2013.01); *G02B 26/101* (2013.01); *G02B 26/105* (2013.01); *G02B 2027/0187* (2013.01); *G06F 3/048* (2013.01); *G06F 3/0482* (2013.01); *G06T 2200/24* (2013.01); *G09G 3/003* (2013.01); *G09G 2340/045* (2013.01); *G09G 2340/0407* (2013.01); *G09G 2340/145* (2013.01)

(58) Field of Classification Search
CPC .......... G06F 1/163; G06F 3/012; G06F 3/013; G06F 3/048; G06F 3/0482; G09G 2340/0407; G09G 2340/045; G09G 2340/145; G09G 2354/00; G09G 2380/14; G09G 3/003; G02B 2027/0138; G02B 2027/014; G02B 2027/0178; G02B 2027/0187; G02B 27/017; G06T 19/006
USPC ............ 345/633, 634, 8, 660, 619, 635, 649
See application file for complete search history.

(56) References Cited

U.S. PATENT DOCUMENTS 7,825,996 B2 11/2010 Yamada et al.
2007/0035562 A1* 2/2007 Azuma et al. ................ 345/633
(Continued)

FOREIGN PATENT DOCUMENTS

JP 08-019004 1/1996
JP 10-341387 A 12/1998
(Continued)

*Primary Examiner* — Jin-Cheng Wang
(74) *Attorney, Agent, or Firm* — Harness, Dickey & Pierce, P.L.C.

(57) ABSTRACT

An image display device that is used by being mounted on the head of an observer, includes: an image forming unit that forms a virtual image as an image that is visually recognizable to the observer; a detection unit that detects movement of the head of the observer; and a control unit that controls the image forming unit on the basis of the movement detected by the detection unit, wherein when the movement that is detected by the detection unit is larger than a predetermined amount, the control unit changes a display position of the virtual image.

17 Claims, 12 Drawing Sheets

(51) Int. Cl.
*G02B 27/00* (2006.01)
*G02B 27/01* (2006.01)
G09G 3/00 (2006.01)
G06F 3/0482 (2013.01)
G06F 3/048 (2013.01)
G02B 26/10 (2006.01)

(56) References Cited

U.S. PATENT DOCUMENTS

| | | | |
|---|---|---|---|
| 2008/0297437 A1* | 12/2008 | Takahashi | 345/8 |
| 2012/0086728 A1* | 4/2012 | McArdle et al. | 345/633 |
| 2012/0242560 A1* | 9/2012 | Nakada et al. | 345/8 |
| 2013/0117707 A1* | 5/2013 | Wheeler | 715/784 |
| 2013/0135353 A1* | 5/2013 | Wheeler et al. | 345/660 |
| 2013/0335301 A1* | 12/2013 | Wong | G02B 27/0093 345/8 |
| 2014/0333666 A1* | 11/2014 | Poulos et al. | 345/633 |

FOREIGN PATENT DOCUMENTS

| | | |
|---|---|---|
| JP | 2000-308092 A | 11/2000 |
| JP | 2003-143477 A | 5/2003 |
| JP | 2003-312592 A | 11/2003 |
| JP | 3671024 B2 | 7/2005 |
| JP | 2005-258022 A | 9/2005 |
| JP | 2005-321479 A | 11/2005 |
| JP | 2007-134785 A | 5/2007 |
| JP | 2008-225079 A | 9/2008 |
| JP | 2008-256816 A | 10/2008 |
| JP | 4599858 B2 | 12/2010 |
| JP | 2012-203128 A | 10/2012 |

\* cited by examiner

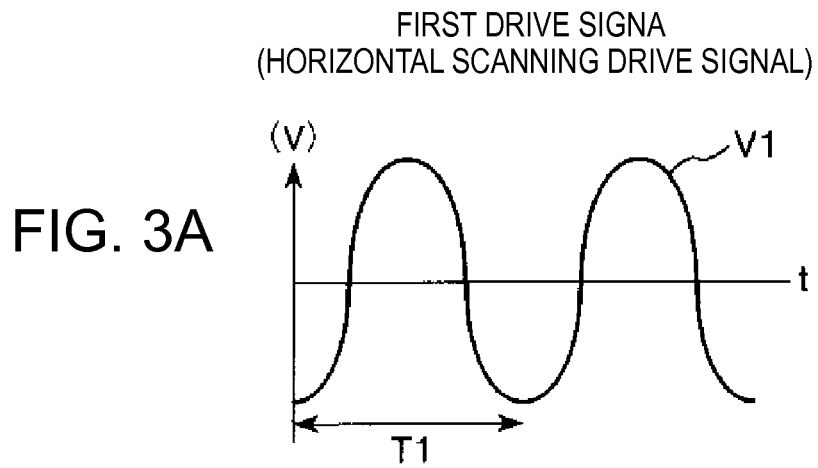
FIG. 3A  FIRST DRIVE SIGNA (HORIZONTAL SCANNING DRIVE SIGNAL)
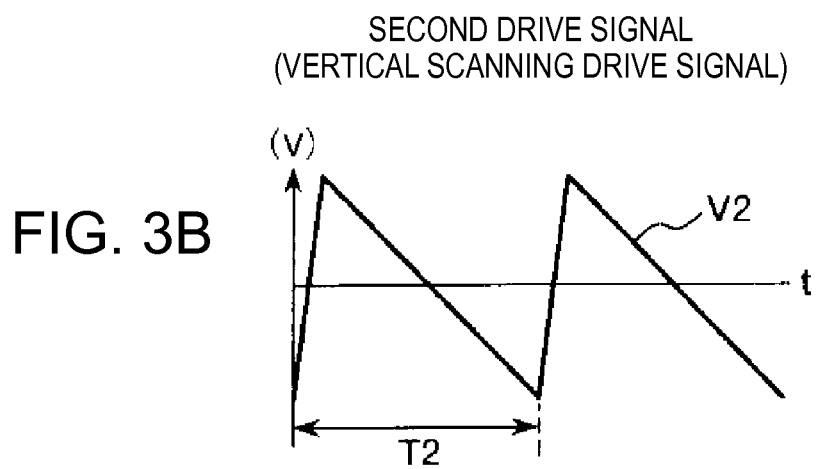
FIG. 3B  SECOND DRIVE SIGNAL (VERTICAL SCANNING DRIVE SIGNAL)

IMAGE DISPLAY DEVICE AND DISPLAY CONTROL METHOD FOR IMAGE DISPLAY DEVICE

BACKGROUND

1. Technical Field

The present invention relates to an image display device and a display control method for an image display device.

2. Related Art

A head mount display (HMD), which is used by being mounted on the head of an observer to display an image that is visually recognized by the observer as a virtual image, is provided for practical use (for example, JP-A-8-19004).

As the head mount display, a so-called see-through type heat mount display, which allows an observer to carry out visual recognition by superimposing the outside image and the virtual image, is known.

In the see-through type head mount display, even when changing a direction of the face to keep an eye on a predetermined object in the outside during appreciation of the virtual image, if a display position of the virtual image is located at a directly forward side of a visual line, it becomes inconvenient.

Therefore, as disclosed in JP-A-8-19004, a technology of detecting movement of a HMD main body and moving a display position of the virtual image in a direction opposite to the detected movement of the HMD main body is considered.

However, in the head mount display disclosed in JP-A-8-19004, the display position of the virtual image is moved in such a manner that the display position of the virtual image is fixed with respect to a predetermined position of the outside image, and thus when the HMD main body is moved, the display position of the virtual image always moves in response to the movement of the HMD main body.

Therefore, even when the observer desires to change the direction of the face while maintaining appreciation of the virtual image, the display position of the virtual image deviates from a directly forward side of a visual line. As a result, it is inconvenient for the observer.

SUMMARY

An advantage of some aspects of the invention is to provide an image display device and a display control method for the image display device which are capable of improving convenience in comparison to the related art in a see-through type head mount image display device.

An aspect of the invention is directed to an image display device that is used by being mounted on the head of an observer. The image display device includes an image forming unit that forms a virtual image as an image that is visually recognizable to the observer, a detection unit that detects movement of the head of the observer when being used, and a control unit that controls the image forming unit on the basis of the movement detected by the detection unit. When the movement detected by the detection unit is larger than a predetermined amount, the control unit changes a display position of the virtual image.

According to the image display device, in an image display device that allows a virtual image to be visually recognized by an observer while being superimposed on an outside image, a display position of the virtual image is changed at a desired time to increase visibility of the outside image, and the display position of the virtual image is prevented from being changed at the other times. Accordingly, it is possible to provide excellent convenience to the observer.

In the image display device of an aspect of the invention, it is preferable that the detection unit detects an angular velocity around a predetermined axis of the head as the movement of the head.

With this configuration, the detection unit can detect a variation in a direction of the head of the observer. Accordingly, the control unit can switch a first state to a second state on the basis of the variation in the direction of the head of the observer.

In the image display device of an aspect of the invention, it is preferable that the detection unit detects angular velocities around three axes of the head in directions intersecting each other, respectively, and when a sum of the angular velocities around the three axes is equal to or more than a predetermined value, the control unit determines that the movement detected by the detection unit is larger than the predetermined amount.

With this configuration, it is possible to determine whether or not the movement of the head of the observer is larger than the predetermined amount in a further reliable manner.

In the image display device of an aspect of the invention, it is preferable that, when the predetermined value is set as $\omega_0$ [rad/sec], and an angle of view of a region capable of displaying the virtual image is set as $\theta_0$ [rad], a relationship of $\omega_0 > \theta_0/0.5$ is satisfied.

With this configuration, it is possible to provide excellent convenience to the observer.

In the image display device of an aspect of the invention, it is preferable that the control unit switches a plurality of states including a first state in which the virtual image is displayed at a reference position and a second state in which the virtual image is displayed at a position different from the reference position, determines whether or not the movement detected by the detection unit is larger than the predetermined amount, and switches the first state to the second state when it is determined that the movement detected by the detection unit is larger than the predetermined amount.

With this configuration, the display position of the virtual image is changed by setting the displaying of the image to the second state at a desired time, and thus it is possible to increase visibility of an outside image. In addition, the display of the image is set to the first state at other times, whereby the display position of the virtual image can be prevented from being changed.

In the image display device of an aspect of the invention, it is preferable that, after passage of a predetermined time from the switching from the first state to the second state, the control unit switches the second state to the first state in such a manner that the display position of the virtual image gradually becomes closer to the reference position.

With this configuration, it is possible to reduce discomfort of the observer when changing the display position of the virtual image from the second state to the first state.

In the image display device of an aspect of the invention, it is preferable that, during the switching from the second state to the first state by the control unit, a movement velocity when the display position of the virtual image gradually becomes closer to the reference position is proportional to movement detected by the detection unit when the detection unit detects movement larger than the predetermined amount.

With this configuration, it is possible to reduce discomfort of the observer when changing the display position of the virtual image from the second state to the first state.

In the image display device of an aspect of the invention, it is preferable that the predetermined time is 0.5 seconds or more.

Generally, it is said that a time taken for human beings to visually recognize an object is approximately 0.5 seconds at the shortest. Accordingly, when the second state is maintained for a duration equal to or longer than the 0.5 seconds, in the second state, the observer can visually recognize the outside image in a reliable manner. Accordingly, it is possible to realize excellent visibility of the outside image in the second state.

In the image display device of an aspect of the invention, it is preferable that the predetermined time is adjustable.

With this configuration, it is possible to provide more excellent convenience to the observer.

In the image display device of an aspect of the invention, it is preferable that the control unit carries out the switching from the second state to the first state in such a manner that the display position of the virtual image gradually becomes closer to the reference position step by step.

With this configuration, it is possible to increase visibility of the outside image during switching from the second state to the first state.

In the image display device of an aspect of the invention, it is preferable that, in the second state, the control unit displays the virtual image at a position in a direction opposite to a direction of the movement detected by the detection unit.

With this configuration, in the second state, it is possible to carry out displaying in such a manner that the virtual image is integrated with the outside image.

In the image display device of an aspect of the invention, it is preferable that the control unit obtains a rotation angle from the first state of the head of the observer on the basis of the movement detected by the detection unit, and when the rotation angle is equal to or more than a predetermined angle in the second state, the control unit fixes the display position of the virtual image to an end portion of a region capable of displaying the virtual image.

With this configuration, in the second state, it is possible to realize excellent visibility of the outside image while allowing the virtual image to be visually recognizable.

In the image display device of an aspect of the invention, it is preferable that the control unit reduces a size of the virtual image in the second state with respect to a size of the virtual image in the first state at a predetermined compression ratio.

With this configuration, in the second state, it is possible to realize excellent visibility of the outside image while allowing the virtual image to be visually recognizable.

In the image display device of an aspect of the invention, it is preferable that the compression ratio is changeable.

With this configuration, it is possible to provide more excellent convenience to the observer.

In the image display device of an aspect of the invention, it is preferable that the control unit changes the compression ratio in proportional to the rotation angle.

With this configuration, it is possible to provide particularly excellent convenience to the observer.

In the image display device of an aspect of the invention, it is preferable that, when the angle of view of the region capable of displaying the virtual image is set as $\theta_0$ [rad], and the rotation angle of the head of the observer is set as $\theta_2$, the compression ratio is larger than $\theta_2/\theta_0$.

With this configuration, in the second state, it is possible to realize particularly excellent visibility of the outside image while allowing the virtual image to be visually recognizable.

In the image display device of an aspect of the invention, it is preferable that the image forming unit includes an optical scanner that allows a movable portion provided with a light reflecting portion having a light reflection property to swing around each of two axes perpendicular to each other.

With this configuration, a reduction in size and weight of the image forming unit may be realized. As a result, it is possible to provide more excellent convenience to the observer.

Another aspect of the invention is directed to an image display device including an image forming unit that forms a virtual image as an image that is visually recognizable to the observer, a detection unit that detects movement of the head of the observer, and a control unit that controls the image forming unit on the basis of the movement detected by the detection unit. When the movement that is detected by the detection unit is larger than a predetermined amount, the control unit changes a display position of the virtual image.

According to the image display device, in an image display device that allows a virtual image to be visually recognized by an observer while being superimposed on an outside image, a display position of the virtual image is changed at a desired time to increase visibility of the outside image, and the display position of the virtual image is prevented from being changed at the other times. Accordingly, it is possible to provide excellent convenience to the observer.

Still another aspect of the invention is directed to an image display device that is used by being mounted on the head of an observer. The image display device includes an image forming unit that forms a virtual image as an image that is visually recognizable to the observer, a detection unit that detects movement of the image display device, and a control unit that controls the image forming unit on the basis of the movement detected by the detection unit. When the movement that is detected by the detection unit is larger than a predetermined amount, the control unit changes a display position of the virtual image.

According to the image display device, in an image display device that allows a virtual image to be visually recognized by an observer while being superimposed on an outside image, a display position of the virtual image is changed at a desired time to increase visibility of the outside image, and the display position of the virtual image is prevented from being changed at the other times. Accordingly, it is possible to provide excellent convenience to the observer.

Yet another aspect of the invention is directed to a display control method for an image display device. The display control method includes forming a virtual image as an image that is visually recognizable to an observer at a reference position, detecting movement of the head of the observer and determining whether or not the detected movement is larger than a predetermined amount, and forming the virtual image after changing a display position of the virtual image from the reference position when it is determined in the determination that the detected movement is larger than the predetermined amount.

According to the display control method for an image display device, in the display control method for an image display device that allows a virtual image to be visually recognized by an observer while being superimposed on an outside image, a display position of the virtual image is changed at a desired time to increase visibility of the outside image, and the display position of the virtual image is prevented from being changed at the other times. Accordingly, it is possible to provide excellent convenience to the observer.

BRIEF DESCRIPTION OF THE DRAWINGS

The invention will be described with reference to the accompanying drawings, wherein like numbers reference like elements.

FIGS. 3A and 3B are diagrams illustrating an example of a drive signal of a drive signal generating unit shown in FIG. 2.

DESCRIPTION OF EXEMPLARY EMBODIMENTS

Hereinafter, preferred embodiments of an image display device and a display control method for the image display device according to the invention will be described with reference to the attached drawings.

First Embodiment

Figure 1:
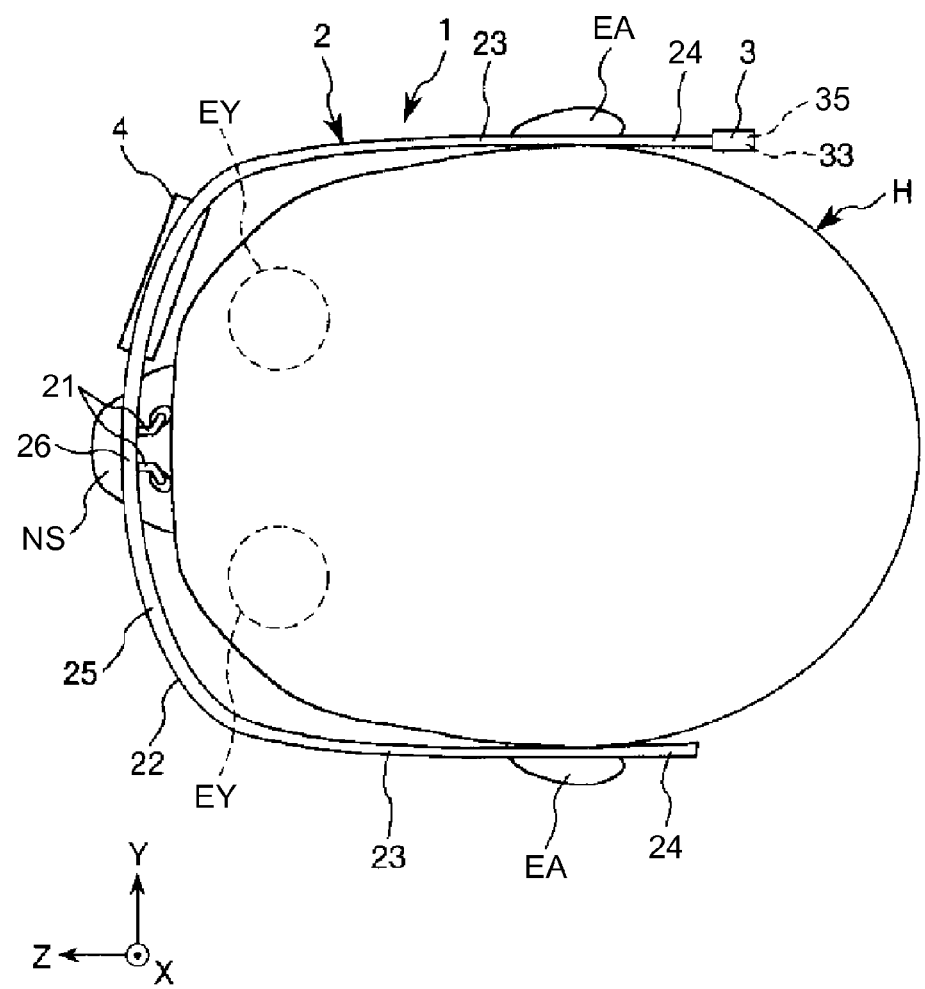
FIG. 1 is a diagram illustrating a schematic configuration of an image display device (head mount display) according to a first embodiment of the invention.
Figure 2:
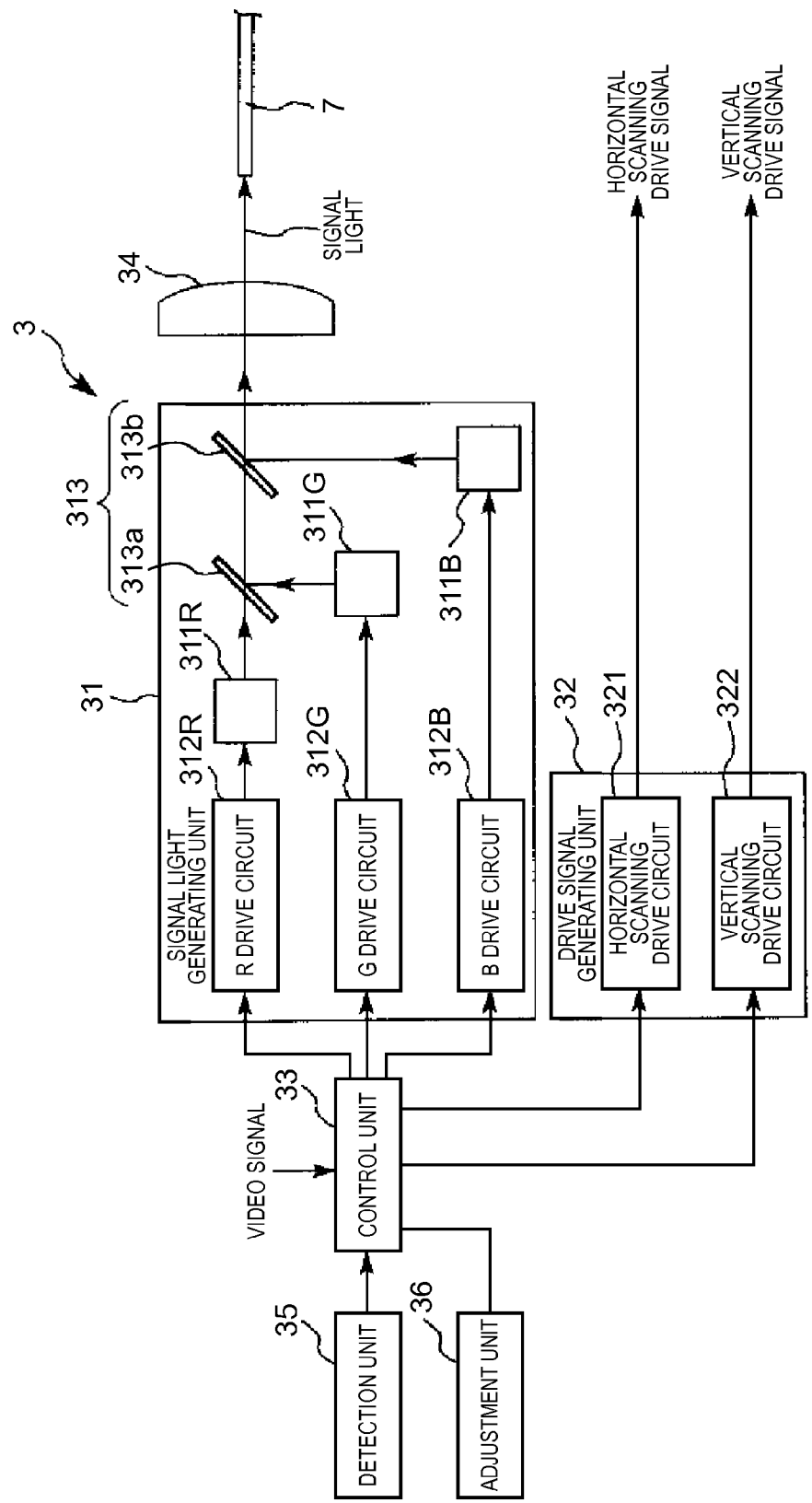
FIG. 2 is a schematic configuration diagram of a control unit of the image display device shown in FIG. 1.
Figure 4:
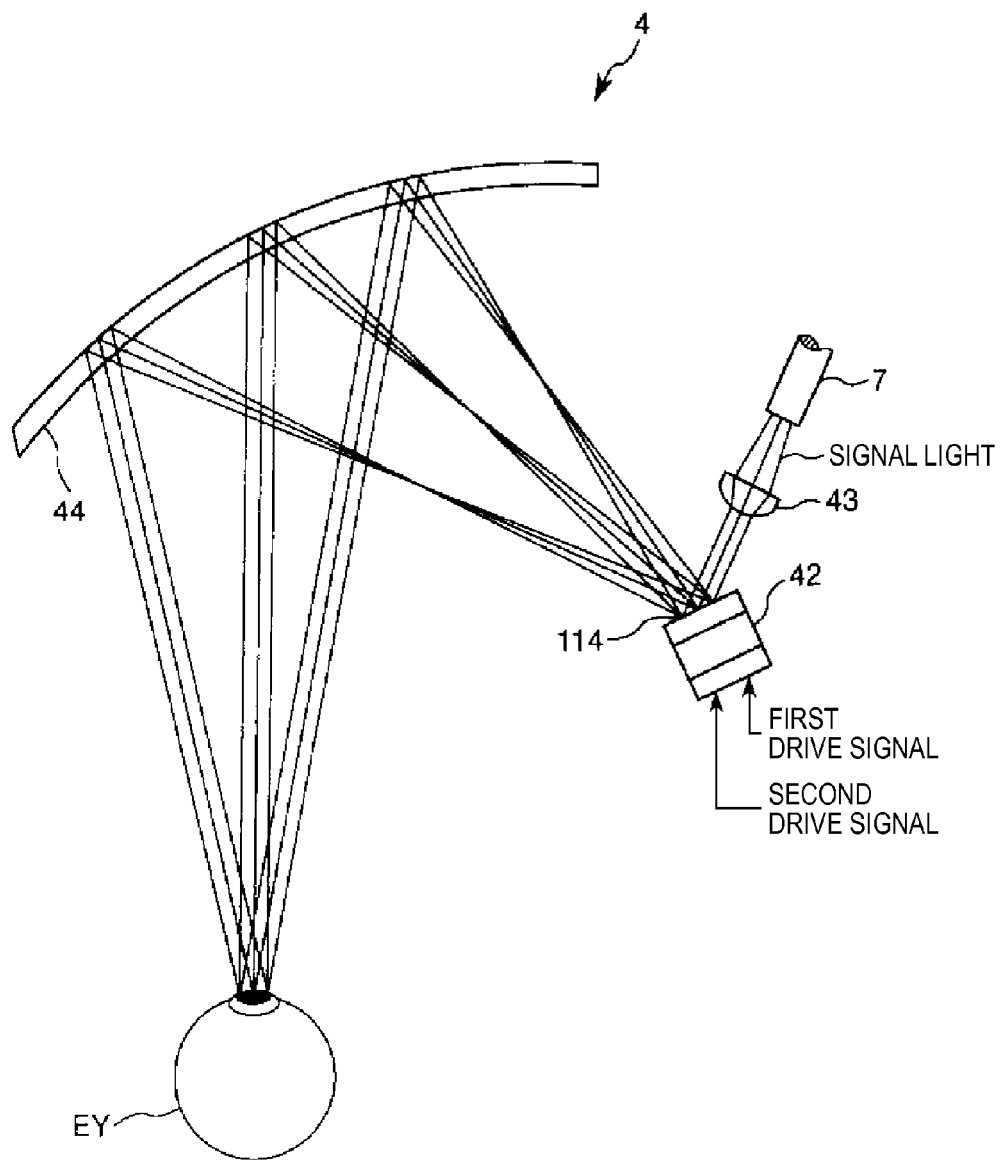
FIG. 4 is a schematic diagram illustrating a schematic configuration of an image forming unit of the image display device shown in FIG. 1.
Figure 5:
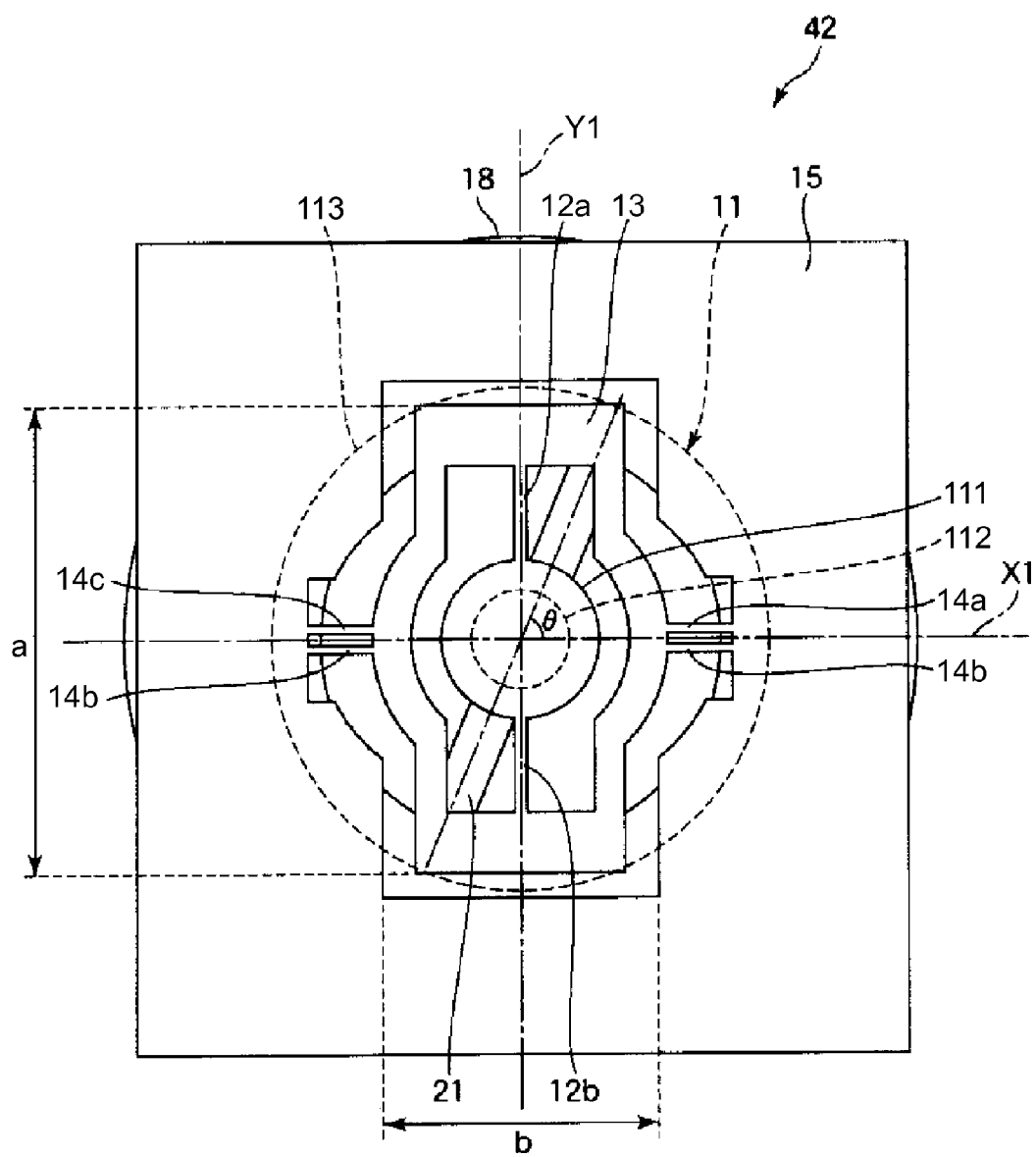
FIG. 5 is a plan view of an optical scanner of the image forming unit shown in FIG. 4.
Figure 6:
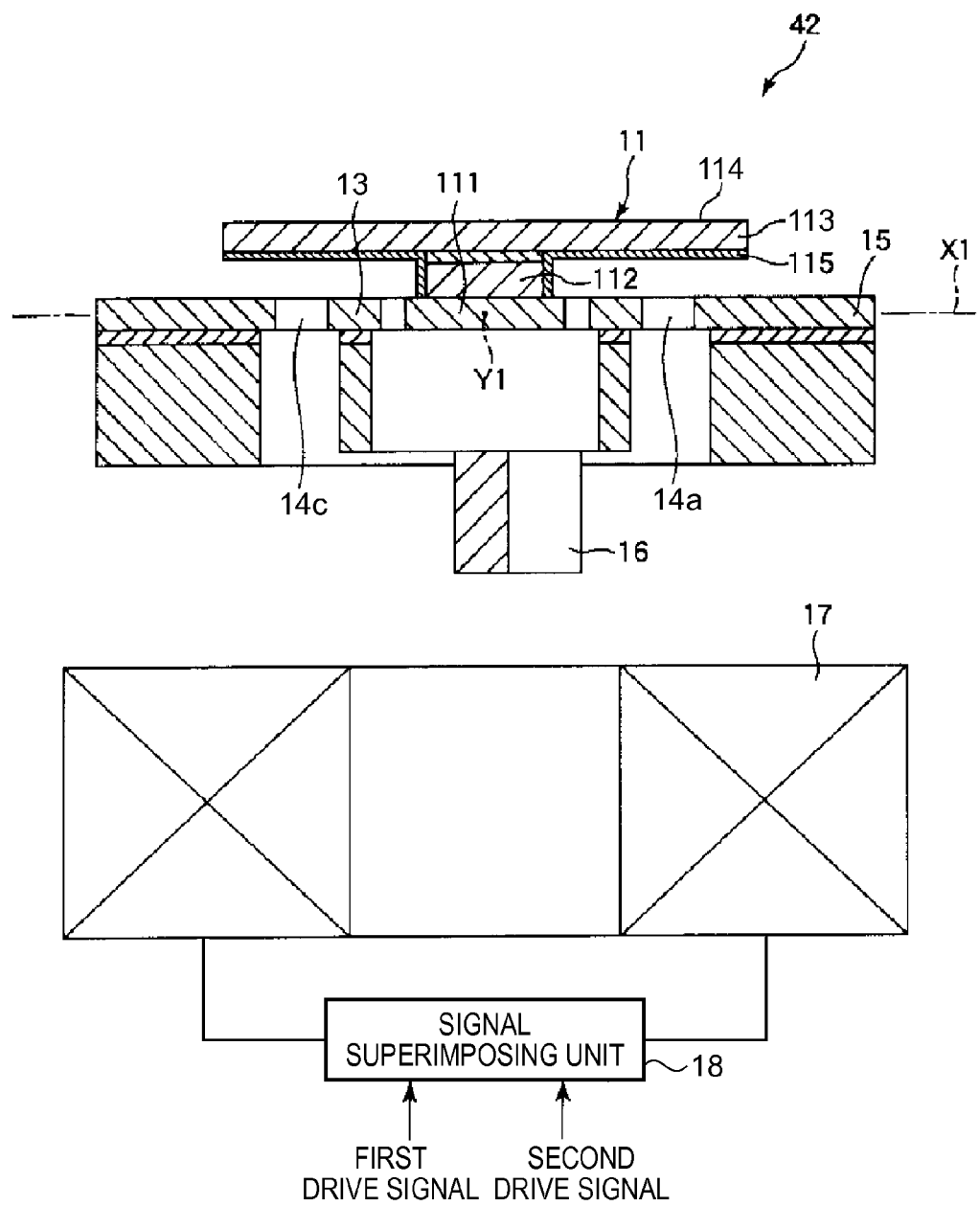
FIG. 6 is a cross-sectional diagram (cross-sectional diagram taken along an X-axis) of the optical scanner shown in FIG. 5.
Figure 7:
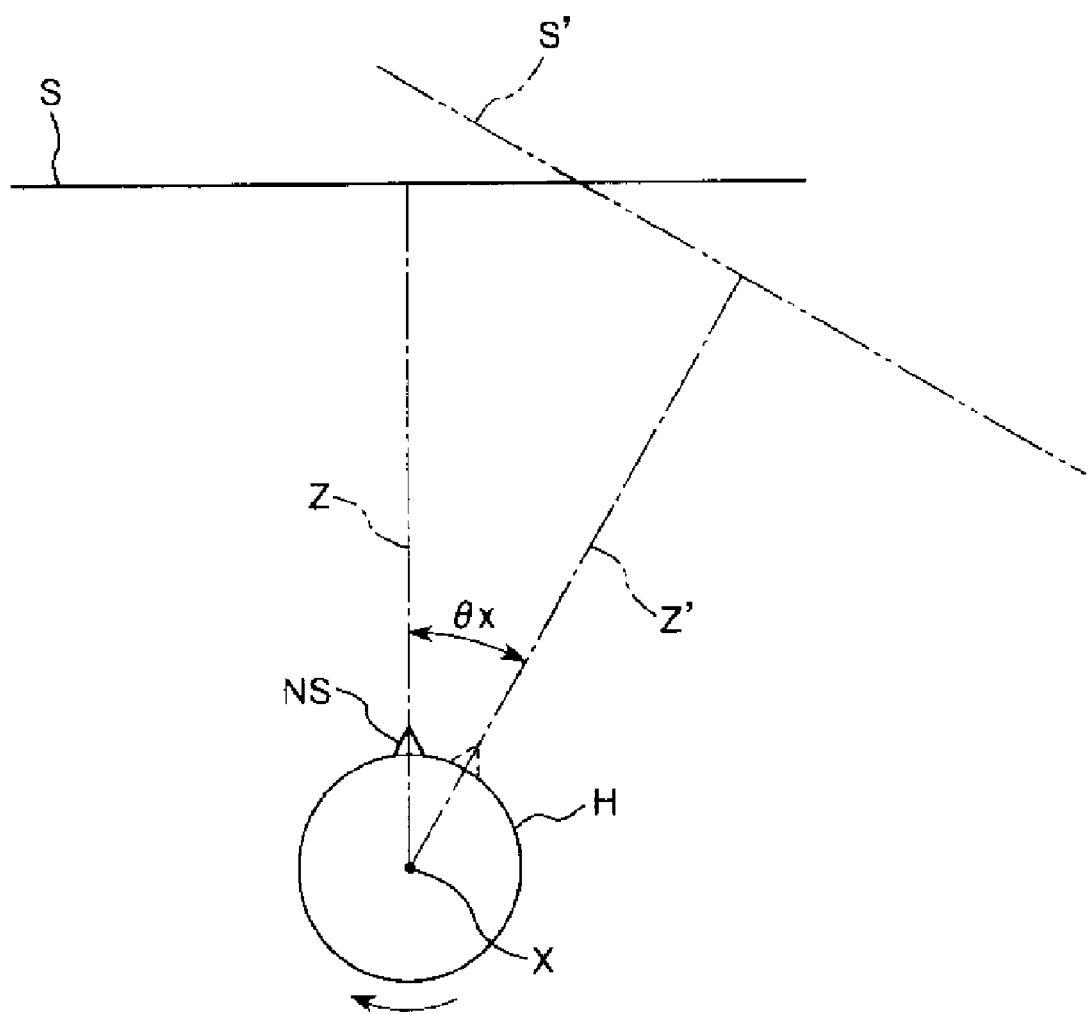
FIG. 7 is a diagram illustrating movement of the head of an observer.
Figure 8A:
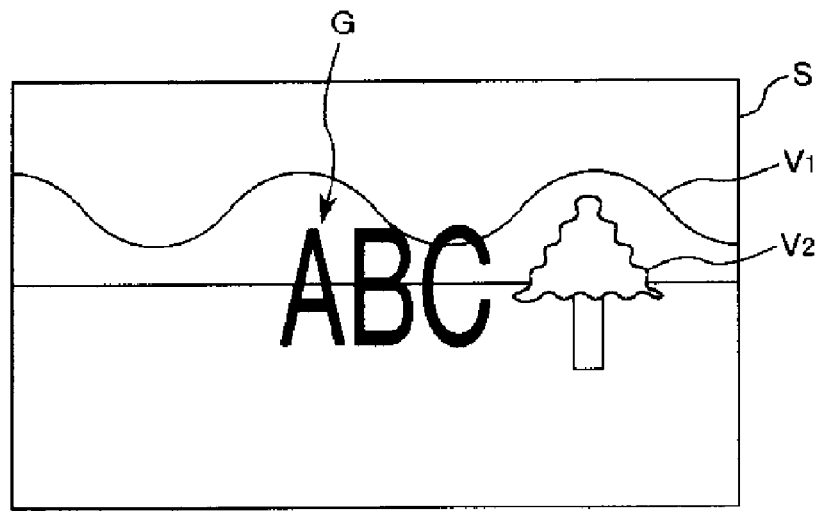
FIGS. 8A to 8C are diagrams illustrating operation (variation in a display position of the virtual image) of the image display device shown in FIG. 1.
Figure 8B:
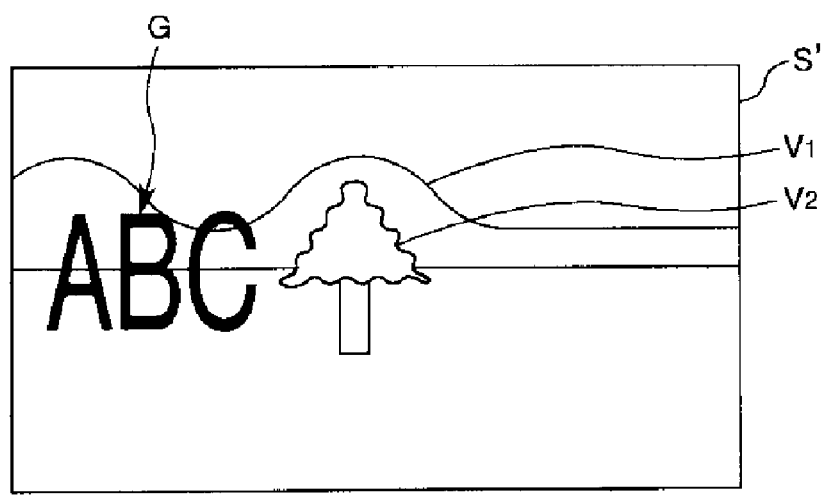
Figure 8C:
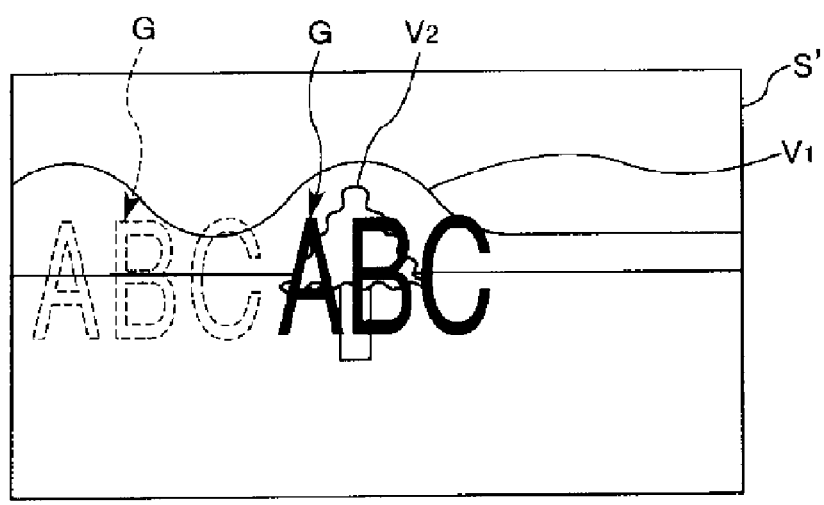
Figure 9A:
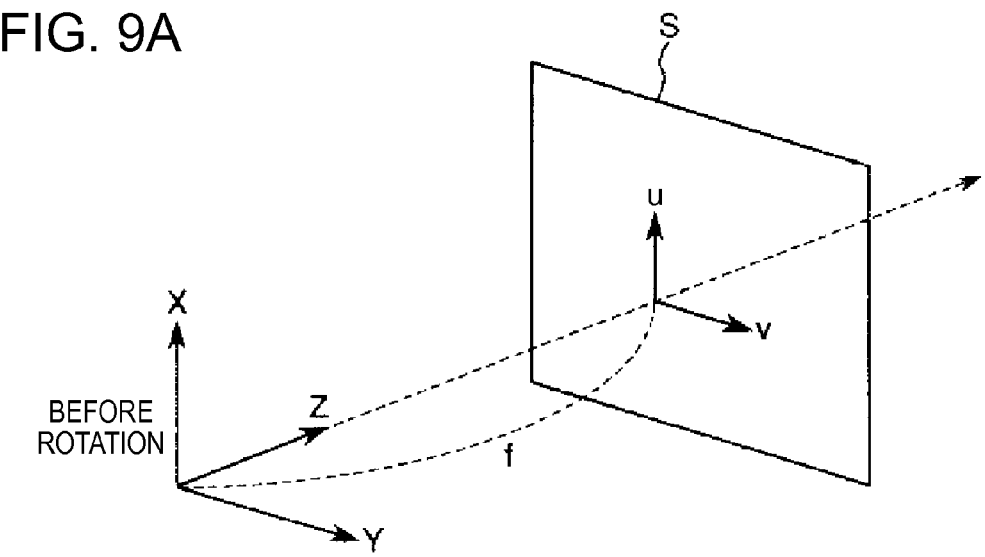
FIGS. 9A and 9B are diagrams illustrating a relationship between the movement of the head of the observer and the display position of the virtual image which are shown in FIG. 7.
Figure 9B:
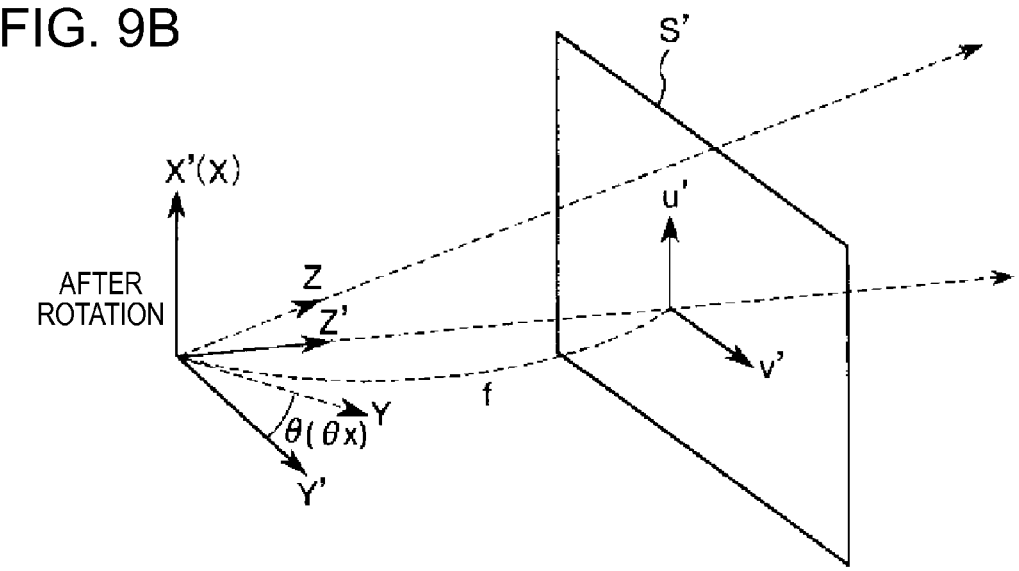
Figure 10:
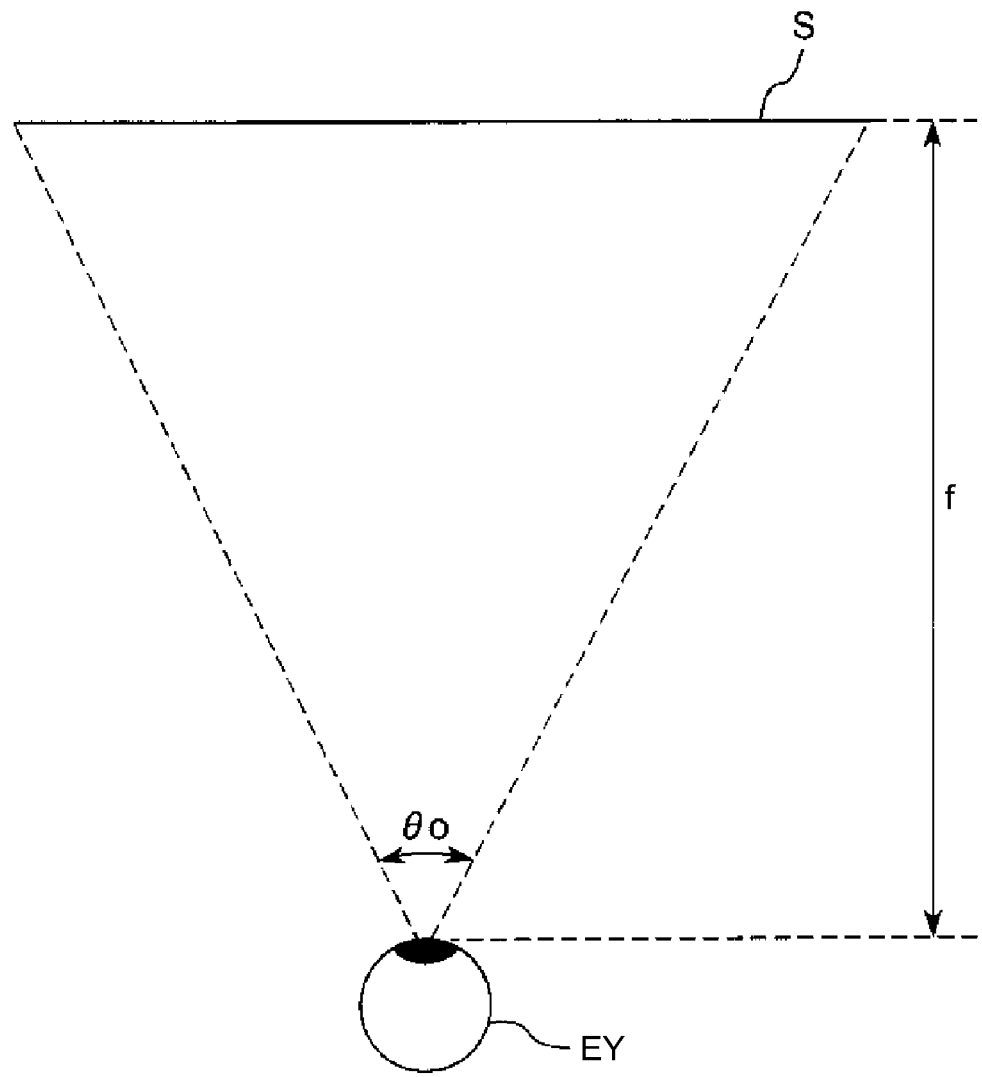
FIG. 10 is a diagram illustrating an angle of view of a region capable of displaying the virtual image.
Figure 11:
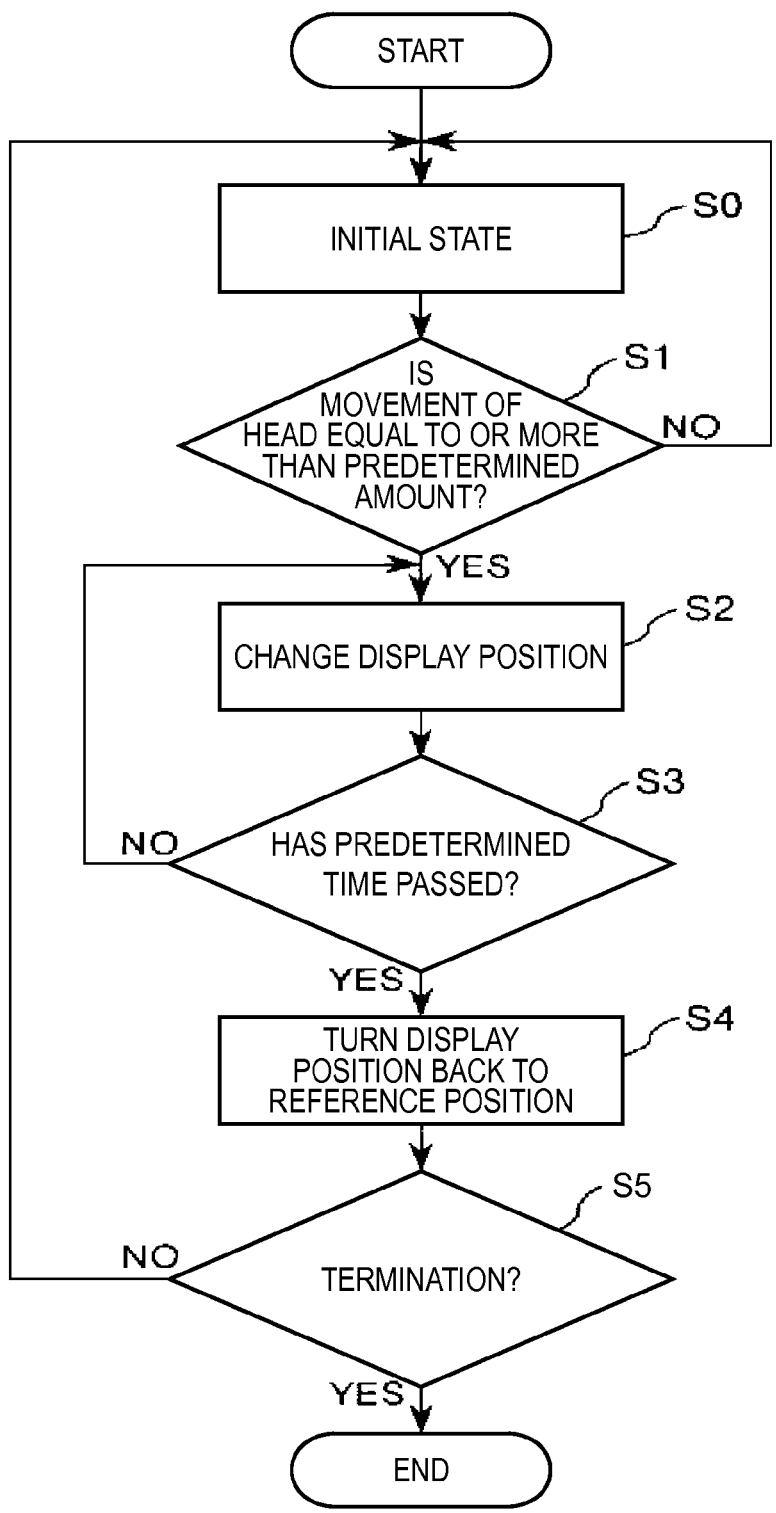
FIG. 11 is a flowchart illustrating an operation of the image display device shown in FIG. 1.

FIG. 1 shows a diagram illustrating a schematic configuration of an image display device (head mount display) according to a first embodiment of the invention, FIG. 2 shows a schematic configuration diagram of a control unit of the image display device shown in FIG. 1, FIGS. 3A and 3B show diagrams illustrating an example of a drive signal of a drive signal generating unit shown in FIG. 2, FIG. 4 shows a schematic diagram illustrating a schematic configuration of an image forming unit of the image display device shown in FIG. 1, FIG. 5 shows a plan view of an optical scanner of the image forming unit shown in FIG. 4, FIG. 6 shows a cross-sectional diagram (cross-sectional diagram taken along an X-axis) of the optical scanner shown in FIG. 5, FIG. 7 shows a diagram illustrating movement of the head of an observer, FIGS. 8A to 8C show diagrams illustrating operation (variation in a display position of the virtual image) of the image display device shown in FIG. 1, FIGS. 9A and 9B show diagrams illustrating a relationship between the movement of the head of the observer and the display position of the virtual image which are shown in FIG. 7, FIG. 10 shows a diagram illustrating an angle of view of a region capable of displaying the virtual image, and FIG. 11 is a flowchart illustrating an operation of the image display device shown in FIG. 1.

In addition, in FIGS. 1, 7, and 9, an X-axis, a Y-axis, and a Z-axis are shown as three axes perpendicular to each other for convenience of description, and a front end side of an an arrow of each of the axes is set as a "positive (+) side", and a base end side is set as a "negative (−) side". In addition, a direction parallel with the X-axis is set as an "X-axis direction", a direction parallel with the Y-axis direction is set as a "Y-axis direction", and a direction parallel with the Z-axis is set as a "Z-axis direction".

Here, the X-axis, the Y-axis, and the Z-axis are set in such a manner that when an image display device 1 to be described later is mounted on the head H of an observer, at an arbitrary reference time, the X-axis direction becomes the vertical direction of the head H, the Y-axis direction becomes the horizontal direction of the head H, and the Z-axis direction becomes the front-back direction of the head H. In addition, the X-axis, the Y-axis, and the Z-axis are set in such a manner that when the image display device 1 to be described later is mounted on the head H of the observer, at an arbitrary reference time, the X-axis direction becomes the vertical direction (vertical scanning direction) of an display surface (screen) of the virtual image, the Y-axis direction becomes the horizontal direction (horizontal scanning direction) of the display surface of the virtual image, and the Z-axis direction becomes a direction perpendicular to the display surface of the virtual image.

As shown in FIG. 1, the image display device 1 according to this embodiment is a head mount display (head mount type image display device) having an exterior appearance like eyeglasses. The image display device 1 is used by being mounted on the head H of an observer and allows an image due to a virtual image to be visually recognized by the observer in a state of being superimposed on an outside image.

The image display device 1 includes a frame 2, a control unit 3 that is supported by the frame 2, and an image forming unit 4.

In the image display device 1, the image forming unit 4 operates on the basis of a signal transmitted from the control unit 3, and the image forming unit 4 carries out two-dimensional scanning with light toward a right eye EY of the observer to form a virtual image that is visually recognizable to the observer.

In addition, in this embodiment, description will be made with respect to a case in which the image forming unit 4 is provided only on a right side of the frame 2 to form a virtual image for a right eye as an example, but an image forming unit having the same configuration as the image forming unit 4 may be provided at a left side of the frame 2 to form a virtual image for a left eye in combination with the virtual image for the right eye. In addition, only the virtual image for the left eye may be formed.

Hereinafter, respective portions of the image display device 1 will be sequentially described in detail.

Frame

As shown in FIG. 1, the frame 2 has the same shape as a frame of eyeglasses, and has a function of supporting the control unit 3 and the image forming unit 4.

In addition, as shown in FIG. 1, the frame 2 includes a front portion 22 that supports the image forming unit 4 and a nose pad portion 21, a pair of temple portions (hanging portion) 23 that is connected to the front portion 22 and comes into contact with ears of a user, and an ear bend portion 24 that is an end portion opposite to the front portion 22 of each of the temple portions 23.

When in use, the nose pad portion 21 comes into contact with a nose NS of the observer and supports the image display device 1 against the head of the observer. The front portion 22 includes a rim portion 25 and a bridge portion 26.

The nose pad portion 21 is configured to adjust a position of the frame 2 with respect to the observer when in use.

In addition, the shape of the frame 2 is not limited to a shape shown in the drawing as long as the frame 2 can be mounted on the head H of the observer.

Control Unit

As shown in FIG. 1, the control unit 3 is mounted on one of the ear bend portions 24 (right ear bend portion 24 in this embodiment) of the above-described frame 2.

That is, when being used, the control unit 3 is disposed on a side opposite to the eye EY with the ear EA of the observer made as a reference. According to this, the weight balance of the image display device 1 may be excellent.

The control unit 3 has a function of generating signal light that is scanned by an optical scanning unit 42 of the image forming unit 4 to be described later and a function of generating a drive signal that drives the optical scanning unit 42.

As shown in FIG. 2, the control unit 3 includes a signal light generating unit 31, a drive signal generating unit 32, a control unit 33, a lens 34, a detection unit 35, and an adjustment unit 36.

The signal light generating unit 31 generates the signal light that is scanned (optically scanned) by the optical scanning unit (optical scanner) 42 of the image forming unit 4 to be described later.

The signal light generating unit 31 includes a plurality of light sources 311R, 311G, and 311B which have wavelengths different from each other, a plurality of drive circuits 312R, 312G, and 312B, and a photosynthesis unit (synthesis unit) 313.

The light source 311R(R light source) emits red light, the light source 311G (G light source) emits green light, and the light source 311B (B light source) emits blue light. A full-color image can be displayed using the three colors of light.

The light sources 311R, 311G, and 311B are not particularly limited, but for example, a laser diode and an LED may be used.

The light sources 311R, 311G, and 311B are electrically connected to the drive circuits 312R, 312G, and 312B, respectively.

The drive circuit 312R has a function of driving the above-described light source 311R, the drive circuit 312G has a function of driving the above-described light source 311G, and the drive circuit 312B has a function of driving the above-described light source 311B.

The three beams (three colors) of light that are emitted from the light sources 311R, 311G, and 311B that are driven by the drive circuits 312R, 312G, and 312B are incident to the photosynthesis unit 313.

The photosynthesis unit 313 synthesizes light from the plurality of light sources 311R, 311G, and 311B. According to this, it is possible to reduce the number of optical fibers that transmit the signal light generated by the signal light generating unit 31 to the image forming unit 4. Accordingly, in this embodiment, it is possible to transmit the signal light from the control unit 3 to the image forming unit 4 through one optical fiber 7 that is provided along the temple portion of the frame 2.

In this embodiment, the photosynthesis unit 313 includes two dichroic mirrors 313a and 313b.

The dichroic mirror 313a has a function of transmitting red light and reflecting green light. In addition, the dichroic mirror 313b has a function of transmitting red light and green light and reflecting blue light.

Three colors of light including red light, green light, and blue light transmitted from the light sources 311R, 311G, and 311B are synthesized using the dichroic mirrors 313a and 313b to form a signal light.

In this embodiment, the light sources 311R, 311G, and 311B are disposed in such a manner that optical path lengths of the red light, green light, and blue light transmitted from the light sources 311R, 311G, and 311B are equal to each other.

In addition, the photosynthesis unit 313 is not limited to the configuration using the above-described dichroic mirror, and may be constituted by, for example, an optical waveguide, an optical fiber, and the like.

The signal light generated by the signal light generating unit 31 is input to the optical fiber 7 through the lens 34. In addition, the signal light is transmitted to an optical scanning unit 42 of the image forming unit 4 to be described later through the optical fiber 7.

In this manner, when using the optical fiber 7 that guides the signal light generated by the signal light generating unit 31 to the optical scanning unit 42, the degree of freedom of a position at which the signal light generating unit 31 is provided increases.

Here, the lens 34 concentrates the signal light generated by the signal light generating unit 31 to input the signal light to the optical fiber 7. In addition, the lens 34 may be provided as necessary or may be omitted. In addition, for example, the signal light may be input to the optical fiber 7 by providing a lens between each of the light sources 311R, 311G, and 311B and the photosynthesis unit 313 instead of the lens 34.

The drive signal generating unit 32 generates a drive signal that drives the optical scanning unit 42 (optical scanner) of the image forming unit 4 to be described later.

The drive signal generating unit 32 includes a drive circuit 321 (first drive circuit) that generates a first drive signal to be used for scanning (horizontal scanning) in a first direction of the optical scanning unit 42, and a drive circuit 322 (second drive circuit) that generates a second drive signal to be used for scanning (vertical scanning) in a second direction perpendicular to the first direction of the optical scanning unit 42.

For example, as shown in FIG. 3A, the drive circuit 321 generates a first drive signal V1 (a voltage for the horizontal scanning) that periodically varies at a period T1. In addition, as shown in FIG. 3B, the drive circuit 322 generates a second drive signal V2 (a voltage for the vertical scanning) that periodically varies at a period T2 different from the period T1.

In addition, details of the first drive signal and the second drive signal will be described later.

The drive signal generating unit 32 is electrically connected to the optical scanning unit 42 of the image forming unit 4 to be described later through a signal line (not shown). According to this, the drive signals (the first drive signal and the second drive signal) generated by the drive signal generating unit 32 are input to the optical scanning unit 42 of the image forming unit 4 to be described later.

The drive circuits 312R, 312G, and 312B of the signal light generating unit 31, and the drive circuits 321 and 322 of the drive signal generating unit 32 are electrically connected to the control unit 33.

The control unit 33 has a function of controlling driving of the drive circuits 312R, 312G, and 312B of the signal light generating unit 31, and the drive circuits 321 and 322 of the drive signal generating unit 32 on the basis of a video signal (image signal). That is, the control unit 33 has a function of controlling the driving of the image forming unit 4.

According to this, the signal light generating unit 31 generates signal light that is modulated according to image information, and the drive signal generating unit 32 generates a drive signal according to the image information.

In addition, the control unit 33 is configured to control driving of the image forming unit 4 on the basis of a detection result by the detection unit 35. Particularly, when movement of the image display device 1 (more specifically, movement of the head H of the observer) is larger than a predetermined amount, the control unit 33 changes a display position of a virtual image.

The detection unit 35 has a function of detecting the movement of the head H of the observer when in use. In addition, the configuration of the detection unit 35 and the changing of the display position of the virtual image will be described later in detail together with description of operation of the image display device 1.

In addition, the adjustment unit 36 is electrically connected to the control unit 33, and the control unit 33 is configured to adjust and modify various kinds of settings on the basis of operation of the adjustment unit 36.

For example, the adjustment unit 36 includes an operation unit such as a touch panel, a button, and a switch that can be operated by the observer, and has a function of changing setting conditions of the control unit 3. For example, a plurality of setting conditions are set to the adjustment unit 36 in advance, and the adjustment unit 36 selects and sets an arbitrary setting condition among the plurality of setting conditions by the operation of the operation unit.

Image Forming Unit

As shown in FIG. 1, the image forming unit 4 is mounted on a portion on one side (in this embodiment, a right side) of the above-described frame 2.

That is, when being used, the image forming unit 4 is disposed to be located in front of one (right) eye EY of the observer.

The image forming unit 4 has a function of forming a virtual image as an image that is visually recognizable to the observer (a function of emitting image light (scanning light) that forms an image on the retina of the eye EY).

As shown in FIG. 4, the image forming unit 4 includes an optical scanning unit 42, a lens 43 (a coupling lens), and a reflection unit 44.

The optical scanning unit 42 is an optical scanner that two-dimensionally scans the signal light transmitted from the signal light generating unit 31. When the optical scanning unit 42 scans the signal light, scanning light is formed.

As shown in FIG. 5, the optical scanning unit 42 includes a movable mirror portion 11, one pair of shaft portions 12a and 12b (first shaft portions), a frame portion 13, two pairs of shaft portions 14a, 14b, 14c, and 14d (second shaft portions), a support portion 15, a permanent magnet 16, and a coil 17. In other words, the optical scanning unit 42 has a so-called gimbal structure.

Here, the movable mirror portion 11 and the one pair of shaft portion 12a and 12b constitute a first oscillation system that swings (reciprocally rotates) around a Y1-axis (first axis). In addition, the movable mirror portion 11, the one pair of shaft portions 12a and 12b, the frame portion 13, the two pairs of shaft portions 14a, 14b, 14c, and 14d, and the permanent magnet 16 constitute a second oscillation system that swings (reciprocally rotates) around an X1-axis (second axis).

In addition, the optical scanning unit 42 includes a signal superimposing unit 18 (refer to FIG. 6), and the permanent magnet 16, the coil 17, the signal superimposing unit 18, and the drive signal generating unit 32 constitute a driving unit that drives the first oscillation system and the second oscillation system (that is, swings the movable mirror portions 11 around the X1-axis and the Y1-axis).

Hereinafter, respective components of the optical scanning unit 42 will be sequentially described in detail.

The movable mirror portion 11 includes a base portion 111 (a movable portion), and a light reflecting plate 113 that is fixed to the base portion 111 through a spacer 112.

A light reflecting portion 114 having a light reflection property is provided on the top surface (one surface) of the light reflecting plate 113.

The light reflecting plate 113 is provided to be spaced away from the shaft portions 12a and 12b in a thickness direction, and to overlap the shaft portions 12a and 12b when viewed from the thickness direction (hereinafter, referred to as a plan view).

Accordingly, it is possible to make an area of a plate surface of the light reflecting plate 113 large while making a distance between the shaft portion 12a and the shaft portion 12b short. In addition, since the distance between the shaft portion 12a and the shaft portion 12b can be made to be short, reduction in size of the frame portion 13 also can be realized. Further, since the reduction in size of the frame portion 13 can be realized, it is possible to make a distance between the shaft portions 14a and 14b and the shaft portions 14c and 14d short.

According to this, even when the area of the plate surface of the light reflecting plate 113 is made to be large, reduction in size of the optical scanning unit 42 can be realized. In other words, it is possible to make the size of the optical scanning unit 42 with respect to the area of the light reflecting portion 114 small.

In addition, the light reflecting plate 113 is formed to cover the entirety of the shaft portions 12a and 12b in a plan view. In other words, each of the shaft portions 12a and 12b is located on an inner side with respect to the outer periphery of the light reflecting plate 113 in a plan view. According to this, the area of the plate surface of the light reflecting plate 113 increases, and as a result thereof, it is possible to make an area of the light reflecting portion 114 large. In addition, it is possible to prevent unnecessary light from being reflected by the shaft portions 12a and 12b as stray light.

In addition, the light reflecting plate 113 is formed to cover the entirety of the frame portion 13 in a plan view. In other words, the frame portion 13 is located at an inner side with respect to the outer periphery of the light reflecting plate 113 in a plan view. According to this, the area of the plate surface of the light reflecting plate 113 increases, and as a result, it is possible to make the area of the light reflecting portion 114 large. In addition, it is possible to prevent unnecessary light from being reflected by the frame portion 13 as stray light.

Further, the light reflecting plate 113 is formed to cover the entirety of the shaft portions 14a, 14b, 14c, and 14d in a plan view. In other words, the shaft portions 14a, 14b, 14c, and 14d are located at an inner side with respect to the outer periphery of the light reflecting plate 113 in a plan view. According to this, the area of the plate surface of the light reflecting plate 113 increases, and as a result, it is possible to make the area of the light reflecting portion 114 large. In addition, it is possible to prevent unnecessary light from being reflected by the shaft portions 14a, 14b, 14c, and 14d as stray light.

In this embodiment, the light reflecting plate 113 has a circular shape in a plan view. In addition, the shape of the light reflecting plate 113 in a plan view is not limited thereto, and may be a polygonal shape such as an elliptical shape and a rectangular shape.

As shown in FIG. 6, a hard layer 115 is provided on the bottom surface (the other surface) of the light reflecting plate 113.

The hard layer 115 is constituted by a material that is harder than a constituent material of a main body of the light reflecting plate 113. According to this, it is possible to increase the rigidity of the light reflecting plate 113. Accordingly, it is possible to prevent or suppress deflection during swinging of the light reflecting plate 113. In addition, the thickness of the light reflecting plate 113 may be made to be small so as to decrease a moment of inertia during swinging of the light reflecting plate 113 around the X1-axis and the Y1-axis.

The constituent material of the hard layer 115 is not particularly limited as long as the constituent material is harder than the constituent material of the main body of the light reflecting plate 113, and for example, diamond, a carbon nitride film, quartz crystal, sapphire, lithium tantalate, potassium niobate, and the like may be used. Particularly, it is preferable to use diamond.

Although not particularly limited, the thickness (average thickness) of the hard layer 115 is preferably approximately 1 μm to 10 μm, and more preferably approximately 1 μm to 5 μm.

In addition, the hard layer 115 may be configured as a single layer or a laminated body of a plurality of layers. In addition, the hard layer 115 is provided as necessary and may be omitted.

For formation of the hard layer 115, for example, a chemical vapor deposition (CVD) method such as plasma CVD, thermal CVD, and laser CVD, a dry plating method such as vacuum deposition, sputtering, and ion plating, a wet plating method such as electrolytic plating, immersion plating, and electroless plating, thermal spraying, bonding of a sheet-shaped member, and the like may be used.

In addition, the bottom surface of the light reflecting plate 113 is fixed to the base portion 111 through the spacer 112. According to this, it is possible to swing the light reflecting plate 113 around the Y1-axis while preventing the light reflecting plate 113 from coming into contact with the shaft portions 12a and 12b, the frame portion 13, and the shaft portions 14a, 14b, 14c, and 14d.

In addition, in a plan view, the base portion 111 is located at an inner side with respect to the outer periphery of the light reflecting plate 113. That is, an area of a surface (plate surface) of the light reflecting plate 113 on which the light reflecting portion 114 is provided is larger than an area of a surface of the base portion 111 to which the spacer 112 is fixed. In addition, it is preferable that the area of the base portion 111 in a plan view be made to be as small as possible as long as the base portion 111 is capable of supporting the light reflecting plate 113 through the spacer 112. According to this, it is possible to make a distance between the shaft portion 12a and the shaft portion 12b small while making the area of the plate surface of the light reflecting plate 113 large.

As shown in FIG. 5, the frame portion 13 has a frame shape, and is provided to surround the base portion 111 of the above-described movable mirror portion 11. In other words, the base portion 111 of the movable mirror portion 11 is provided at an inner side of the frame portion 13 having the frame shape.

In addition, the frame portion 13 is supported by the support portion 15 through the shaft portions 14a, 14b, 14c, and 14d. In addition, the base portion 111 of the movable mirror portion 11 is supported by the frame portion 13 through the shaft portions 12a and 12b.

In addition, the frame portion 13 is configured in such a manner that a length in a direction along the Y1-axis is longer than a length in a direction along the X1-axis. That is, when the length of the frame portion 13 in the direction along the Y1-axis is set as a, and the length of the frame portion 13 in the direction along the X1-axis is set as b, a relationship of a>b is satisfied. According to this, it is possible to make the length of the optical scanning unit 42 in the direction along the X1-axis short while securing a length necessary for the shaft portions 12a and 12b.

In addition, the frame portion 13 has a shape according to an external appearance of a structure body constituted by the base portion 111 of the movable mirror portion 11 and the one pair of shaft portions 12a and 12b in a plan view. According to this, it is possible to realize reduction in size of the frame portion 13 while permitting oscillation of the first oscillation system constituted by the movable mirror portion 11 and the one pair of shaft portions 12a and 12b, that is, the swinging of the movable mirror portion 11 around the Y1-axis.

In addition, the shape of the frame portion 13 is not limited to the shape that is shown as long as the frame portion 13 has a frame shape surrounding the base portion 111 of the movable mirror portion 11.

Each of the shaft portions 12a and 12b, and the shaft portions 14a, 14b, 14c, and 14d is elastically deformable.

In addition, the shaft portions 12a and 12b connect the movable mirror portion 11 and the frame portion 13 in such a manner that the movable mirror portion 11 can rotate (swing) around the Y1-axis (first axis). In addition, the shaft portions 14a, 14b, 14c, and 14d connect the frame portion 13 and the support portion 15 in such a manner that the frame portion 13 can rotate (swing) around the X1-axis (second axis) perpendicular to the Y1-axis.

The shaft portions 12a and 12b are disposed to face each other through the base portion 111 of the movable mirror portion 11. In addition, each of the shaft portions 12a and 12b has a rectangular shape that extends in a direction along the Y1-axis. In addition, one end of each of the shaft portions 12a and 12b is connected to the base portion 111, and the other end is connected to the frame portion 13. In addition, each of the shaft portions 12a and 12b is disposed in such a manner that the central axis coincides with the Y1-axis.

Each of the shaft portions 12a and 12b is subjected to torsional deflection along with the swinging around the Y1-axis of the movable mirror portion 11.

The shaft portions 14a and 14b, and the shaft portions 14c and 14d are disposed to face each other through the frame portion 13 (with the frame portion 13 interposed therebetween). In addition, each of the shaft portions 14a, 14b, 14c, and 14d has a rectangular shape that extends in a direction along the X1-axis. In addition, one end of each of the shaft portions 14a, 14b, 14c, and 14d is connected to the frame portion 13, and the other end is connected to the support portion 15. In addition, the shaft portions 14a and 14b are disposed to face each other through the X1-axis, and similarly, the shaft portions 14c and 14d are disposed to face each other through the X1-axis.

In the shaft portions 14a, 14b, 14c, and 14d, the entirety of the shaft portions 14a and 14b and the entirety of the shaft portions 14c and 14d are subjected to torsional deformation along with the swinging of the frame portion 13 around the X1-axis, respectively.

In this manner, the movable mirror portion 11 is allowed to swing around the Y1-axis, and the frame portion 13 is allowed to swing around the X1-axis, and thus the movable mirror portion 11 is allowed to swing (reciprocally rotate) around the two axes including the X1-axis and the Y1-axis that are perpendicular to each other.

In addition, for example, an angle detection sensor such as a strain sensor is provided to at least one shaft portion of the shaft portions 12a and 12b, and at least one shaft portion of the shaft portions 14a, 14b, 14c, and 14d, respectively. The angle detection sensor can detect angular information of the optical scanning unit 42, more specifically, a swing angle of the light reflecting portion 114 around each of the X1-axis and the Y1-axis. A detection result is input to the control unit 33 through a cable (not shown).

In addition, the shape of the each of the shaft portions 12a and 12b, and the shaft portions 14a, 14b, 14c, and 14d is not limited to the above-described shape, and for example, a bent portion, a curved portion, or a diverged portion may be provided at least at one site partway along each of the portions.

The base portion 111, the shaft portions 12a and 12b, the frame portion 13, the shaft portions 14a, 14b, 14c, and 14d, and the support portion 15 are integrally formed.

In this embodiment, the base portion 111, the shaft portions 12a and 12b, the frame portion 13, the shaft portions 14a, 14b, 14c, and 14d, and the support portion 15 are formed by etching an SOI substrate in which a first Si layer (device layer), a $SiO_2$ layer (box layer), and a second Si layer (handle layer) are laminated in this order. According to this, it is possible to realize excellent oscillation characteristics of the first oscillation system and the second oscillation system. In addition, fine processing by etching is possible in the SOI substrate, and thus when forming the base portion 111, the shaft portions 12a and 12b, the frame portion 13, the shaft portions 14a, 14b, 14c, and 14d, and the support portion 15 by using the SOI substrate, it is possible to realize excellent dimensional accuracy of these portions, and reduction in size of the optical scanning unit 42 also can be realized.

In addition, each of the base portion 111, the shaft portions 12a and 12b, and the shaft portions 14a, 14b, 14c, and 14d is constituted by the first Si layer of the SOI substrate. According to this, it is possible to allow the shaft portions 12a and 12b, and the shaft portions 14a, 14b, 14c, and 14d to have excellent elasticity. In addition, when rotating around the Y1-axis, the base portion 111 is prevented from coming into contact with the frame portion 13.

In addition, each of the frame portion 13 and the support portion 15 is constituted by a laminated body of the first Si layer, the $SiO_2$ layer, and the second Si layer of the SOI substrate. According to this, it is possible to allow the frame portion 13 and the support portion 15 to have excellent rigidity. In addition, the $SiO_2$ layer and the second Si layer of the frame portion 13 have not only a function of increasing rigidity of the frame portion 13, as a rib, but also a function of preventing the movable mirror portion 11 from coming into contact with the permanent magnet 16.

In addition, it is preferable that the top surface of the support portion 15 be subjected to a reflection prevention treatment. According to this, it is possible to prevent unnecessary light emitted to the support portion 15 from being stray light.

The reflection prevention treatment is not particularly limited, but examples thereof include formation of a reflection prevention film (dielectric multi-layered film), a roughening treatment, a black color treatment, and the like.

In addition, the constituent material and the forming method of the base portion 111, the shaft portions 12a and 12b, and the shaft portions 14a, 14b, 14c, and 14d are illustrative only, and the invention is not limited thereto.

In addition, in this embodiment, the spacer 112 and the light reflecting plate 113 are also formed by etching the SOI substrate. In addition, the spacer 112 is constituted by a laminated body of the $SiO_2$ layer and the second Si layer of the SOI substrate. In addition, the light reflecting plate 113 is constituted by the first Si layer of the SOI substrate.

As described above, when forming the spacer 112 and the light reflecting plate 113 by using the SOI substrate, it is possible to simply manufacture the spacer 112 and the light reflecting plate 113, which are bonded to each other, with high accuracy.

For example, the spacer 112 is bonded to the base portion 111 by an adhesive material such as an adhesive and a brazing filler material (not shown).

The permanent magnet 16 is bonded to the bottom surface (surface opposite to the light reflecting plate 113) of the frame portion 13.

A method of bonding the permanent magnet 16 and the frame portion 13 to each other is not particularly limited, but for example, a bonding method using an adhesive may be used.

The permanent magnet 16 is magnetized in a direction that is inclined with respect to the X1-axis and the Y1-axis in a plan view.

In this embodiment, the permanent magnet 16 has a rectangular shape (rod shape) extending in a direction that is inclined with respect to the X1-axis and the Y1-axis. In addition, the permanent magnet 16 is magnetized in a horizontal direction thereof. That is, the permanent magnet 16 is magnetized in such a manner that one end is set as an S pole and the other end is set as an N pole.

In addition, in a plan view, the permanent magnet 16 is provided to be symmetric with respect to an intersection between the X1-axis and the Y1-axis as a center.

In addition, in this embodiment, description is made with respect to a case in which one permanent magnet is provided to the frame portion 13 as an example, but there is not limitation thereto. For example, two permanent magnets may be provided to the frame portion 13. In this case, for example, two long permanent magnets may be provided to the frame portion 13 in such a manner that the two long permanent magnets face each other through the base portion 111 in a plan view and become parallel with each other.

Although not particularly limited, an inclined angle θ of a magnetization direction (extending direction) of the permanent magnet 16 with respect to the X1-axis is preferably 30° to 60°, more preferably 45° to 60°, and still more preferably 45°. When the permanent magnet 16 is provided in this manner, it is possible to allow the movable mirror portion 11 to rotate around the X1-axis in a smooth and reliable manner.

As the permanent magnet 16, for example, a neodymium magnet, a ferrite magnet, a samarium cobalt magnet, an alnico magnet, a bonded magnet, and the like may be appropriately used. The permanent magnet 16 is obtained by magnetizing a ferromagnetic body. For example, the permanent magnet 16 is formed by magnetizing the ferromagnetic body before magnetization after providing the ferromagnetic body to the frame portion 13. This is because when providing the permanent magnet 16 that is magnetized already to the frame portion 13, the permanent magnet 16 may not be provided at a desired position due to an effect of magnetic fields of the outside or the other components.

The coil 17 is provided immediately below the permanent magnet 16. That is, the coil 17 is provided to face the bottom surface of the frame portion 13. According to this, it is possible to allow a magnetic field generated from the coil 17 to efficiently operate on the permanent magnet 16. According to this, it is possible to realize electric power saving and reduction in size of the optical scanning unit 42.

The coil 17 is electrically connected to the signal superimposing unit 18 (refer to FIG. 6).

In addition, when a voltage is applied to the coil 17 by the signal superimposing unit 18, a magnet field having a magnetic flux, which is perpendicular to the X1-axis and the Y1-axis, is generated from the coil 17.

The signal superimposing unit 18 includes an adder (not shown) that superimposes the first drive signal V1 and the second drive signal V2, and applies a superimposed voltage to the coil 17.

Here, the first drive signal V1 and the second drive signal V2 will be described in detail.

As described above, as shown in FIG. 3A, the drive circuit 321 generates the first drive signal V1 (voltage for horizontal scanning) that periodically varies at the period T1. That is, the drive circuit 321 generates the first drive signal V1 of a first frequency (1/T1).

The first drive signal V1 forms a waveform like a sinusoidal wave. Accordingly, the optical scanning unit 42 can effectively carry out main scanning of light. In addition, the waveform of the first drive signal V1 is not limited thereto.

In addition, the first frequency (1/T1) is not particularly limited as long as the first frequency is a frequency suitable for horizontal scanning, but 10 kHz to 40 kHz is preferable.

In this embodiment, the first frequency is set to be equal to a torsional resonance frequency (f1) of the first oscillation system (torsional oscillation system) constituted by the movable mirror portion 11 and the one pair of shaft portions 12a and 12b. That is, the first oscillation system is designed (manufactured) in such a manner that the torsional resonance frequency f1 becomes a frequency suitable for the horizontal scanning. According to this, a rotation angle of the movable mirror portion 11 around the Y1-axis can be enlarged.

On the other hand, as described above, the drive circuit 322 generates the second drive signal V2 (voltage for vertical scanning) that periodically varies at the period T2 different from the period T1 as described in FIG. 3B. That is, the drive circuit 322 generates the second drive signal V2 of a second frequency (1/T2).

The second drive signal V2 has a waveform like a saw-tooth wave. Accordingly, the optical scanning unit 42 can effectively carry out vertical scanning (sub-scanning) of light. In addition, the waveform of the second drive signal V2 is not limited thereto.

Differently from the first frequency (1/T1), the second frequency (1/T2) is not particularly limited as long as the second frequency is suitable for the vertical scanning, but 30 Hz to 80 Hz (approximately 60 Hz) is preferable. In this manner, since the frequency of the second drive signal V2 is set to approximately 60 Hz, and the frequency of the first drive signal V1 is set to 10 kHz to 40 kHz as described above, it is possible to allow the movable mirror portion 11 to rotate around each of the two axes (the X1-axis and the Y1-axis), which are perpendicular to each other, at a frequency suitable for drawing in a display. However, a combination of the frequency of the first drive signal V1 and the frequency of the second drive signal V2 is not particularly limited as long as the movable mirror portion 11 is allowed to rotate around each of the X1-axis and the Y1-axis.

In this embodiment, the frequency of the second drive signal V2 is adjusted to be a frequency different from the torsional resonance frequency (resonance frequency) of the second oscillation system (torsional oscillation system) constituted by the movable mirror portion 11, the one pair of shaft portions 12a and 12b, the frame portion 13, the two pairs of shaft portions 14a, 14b, 14c, and 14d, and the permanent magnet 16.

It is preferable that the frequency (second frequency) of the second drive signal V2 be smaller than the frequency (first frequency) of the first drive signal V1. That is, it is preferable that the period T2 be longer than the period T1. Accordingly to this, it is possible to allow the movable mirror portion 11 to rotate around the X1-axis at the second frequency while allowing the movable mirror portion 11 to rotate around the Y1-axis at the first frequency in a more reliable and smooth manner.

In addition, when the torsional resonance frequency of the first oscillation system is set to f1 [Hz], and the torsional resonance frequency of the second oscillation system is set to f2 [Hz], it is preferable that f1 and f2 satisfy a relationship of f2<f1, and more preferably a relationship of f1≥f2. According to this, it is possible to allow the movable mirror portion 11 to rotate around the X1-axis at the frequency of the second drive signal V2 while allowing the movable mirror portion 11 to rotate around the Y1-axis at the frequency of the first drive signal V1 in a more reliable manner. On the contrary, when f1 and f2 are set to satisfy a relationship of f1≤f2, there is a possibility that oscillation of the first oscillation system at the second frequency occurs.

Next, a method of driving the optical scanning unit 42 will be described. In addition, in this embodiment, as described above, the frequency of the first drive signal V1 is set to be equal to the torsional resonance frequency of the first oscillation system, and the frequency of the second drive signal V2 is set to a value different from the torsional resonance frequency of the second oscillation system and to be smaller than the frequency of the first drive signal V1 (for example, the frequency of the first drive signal V1 is set to 15 kHz, and the frequency of the second drive signal V2 is set to 60 Hz).

For example, the first drive signal V1 as shown in FIG. 3A and the second drive signal V2 as shown in FIG. 3B are superimposed in the signal superimposing unit 18, and the resultant superimposed voltage is applied to the coil 17.

In this case, a magnetic field that pulls one end (N pole) of the permanent magnet 16 toward the coil 17 and separates the other end (S pole) of the permanent magnet 16 from the coil 17 (the magnetic field is referred to as a "magnetic field A1"), and a magnetic field that separates one end (N pole) of the permanent magnet 16 from the coil 17 and pulls the other end (S pole) of the permanent magnet 16 toward the coil 17 (the magnetic field is referred to as a "magnetic field A2") are alternately and completely switched by the first drive signal V1.

Here, as described above, the permanent magnet 16 is disposed in such a manner that the respective ends (magnetic poles) are located at two regions divided by the Y1-axis. That is, in a plan view of FIG. 5, the N pole of the permanent magnet 16 is located on one side and the S pole of the permanent magnet 16 is located on the other side with the Y1-axis interposed therebetween. Accordingly, the magnetic field A1 and the magnetic field A2 are alternately and completely switched from each other, and thus oscillation having a torsional oscillation component around the Y1-axis is excited to the frame portion 13, and along with the oscillation, the movable mirror portion 11 is allowed to rotate around the Y1-axis at the frequency of the first drive signal V1 while subjecting the shaft portions 12a and 12b to torsional deformation.

In addition, the frequency of the first drive signal V1 is equal to the torsional resonance frequency of the first oscillation system. Accordingly, it is possible to allow the movable mirror portion 11 to efficiently rotate around the Y1-axis by the first drive signal V1. That is, even when the oscillation having the torsional oscillation component around the Y1-axis of the frame portion 13 is small, the rotation angle of the movable mirror portion 11 around the Y1-axis along with the oscillation can be made to be large.

On the other hand, a magnetic field that pulls one end (N pole) of the permanent magnet 16 toward the coil 17 and separates the other end (S pole) of the permanent magnet 16 from the coil 17 (the magnetic field is referred to as a "magnetic field B1"), and a magnetic field that separates one end (N pole) of the permanent magnet 16 from the coil 17 and pulls the other end (S pole) of the permanent magnet 16 toward the coil 17 (the magnetic field is referred to as a "magnetic field B2") are alternately and completely switched by the second drive signal V2.

Here, as described above, the permanent magnet 16 is disposed in such a manner that the respective ends (magnetic poles) are located at two regions divided by the X1-axis. That is, in a plan view of FIG. 5, the N pole of the permanent magnet 16 is located on one side and the S pole of the permanent magnet 16 is located on the other side with the X1-axis interposed therebetween. Accordingly, the magnetic field B1 and the magnetic field B2 are alternately and completely switched from each other, and thus the frame portion 13 is allowed to rotate around the X1-axis at the frequency of the second drive signal V2 along with the movable mirror portion 11 while subjecting each of the shaft portions 14a and 14b, and the shaft portions 14c and 14d to torsional deformation.

In addition, the frequency of the second drive signal V2 is set to be significantly lower than the frequency of the first drive signal V1. In addition, the torsional resonance frequency of the second oscillation system is designed to be lower than the torsional resonance frequency of the first oscillation system. Therefore, it is possible to prevent the movable mirror portion 11 from rotating around the Y1-axis at the frequency of the second drive signal V2.

According to the optical scanning unit 42 as described above, the movable mirror portion 11 including the light reflecting portion 114 having a light reflection property is allowed to swing around the two axes perpendicular to each other, respectively. Accordingly, reduction in size and weight of the optical scanning unit 42, and reduction in size and weight of the image forming unit 4 can be realized. As a result, it is possible to provide more excellent convenience to the observer.

As shown in FIG. 4, the signal light emitted from the optical fiber 7 is incident to the light reflecting portion 114 of the optical scanning unit 42 through the lens 43.

The lens 43 has a function of adjusting a spot diameter of the signal light emitted from the optical fiber 7. In addition, the lens 43 also has a function of approximately parallelizing the signal light by adjusting a radiation angle of the signal light emitted from the optical fiber 7.

In addition, as shown in FIG. 4, the signal light that is incident to the light reflecting portion 114 is reflected toward the reflection unit 44 while being scanned by the optical scanning unit 42.

The reflection unit 44 is disposed to be located in front of one eye EY of the observer when in use.

The reflection unit 44 has a function of reflecting the signal light from the optical scanning unit 42 toward the eye of the observer.

In this embodiment, the reflection unit 44 is a half mirror, and also has a function of transmitting outside light (translucency with respect to visible light). That is, the reflection unit 44 has a function of reflecting the signal light (scanning light) that is scanned by the optical scanning unit 42 and transmitting outside light facing the eye of the observer from the outside of the reflection unit 44 when in use. According to this, the observer can visually recognize a virtual image (image) formed by the signal light while visually recognizing an outside image. That is, it is possible to realize a see-through type head mount display.

Although not shown in the drawings, for example, the reflection unit 44 includes a transparent substrate (translucent unit) that transmits outside light, and a diffraction lattice that is supported by the transparent substrate 61 and reflects the signal light from the optical scanning unit 42. According to this, it is possible to reduce the number of components of an optical system or to increase the degree of freedom of design by allowing the diffraction lattice to have various optical characteristics. For example, when a hologram element is used as the diffraction lattice, an emission direction of the signal light that is reflected by the reflection unit 44 can be adjusted. In addition, when the diffraction lattice is allowed to have a lens effect, an image formation state of the entirety of scanning light composed of the signal light reflected by the reflection unit 44 can be adjusted.

In addition, the reflection unit 44 is not limited to the above-described configuration. For example, the reflection unit 44 may have a configuration in which a transflective film constituted by a metal thin film, a dielectric multi-layered film, and the like is formed on the transparent substrate.

In this embodiment, the reflection unit 44 has a shape curved along the curvature of the frame 2. In addition, the shape of the reflection unit 44 is determined in correspondence with arrangement of the optical scanning unit 42, optical characteristics of the reflection unit 44 and the lens 43, and is not limited to the shape that is shown in the drawings.

Next, operation of the image display device 1 configured as described above will be described.

In the image display device 1, when movement (that is, movement of the head H of the observer) that is detected by the detection unit 35 is larger than a predetermined amount, the control unit 33 changes a display position of the virtual image.

Specifically, the control unit 33 can carry out switching a plurality of states including a first state (hereinafter, also simply referred to as a "first state") in which the display position of the virtual image is set to a reference position, and a second state (hereinafter, also simply referred to as a "second state") in which the display position of the virtual image is changed from the reference position in response to the movement detected by the detection unit 35.

In addition, the control unit 33 determines whether or not the movement detected by the detection unit 35 is larger than the predetermined amount, and carries out switching from the first state to the second state when it is determined that the movement detected by the detection unit 35 is larger than the predetermined amount.

According to this, the second state is set at a desired time to change the display position of the virtual image, and thus visibility of an outside image can be raised. In addition, the first state is set at the other times, thereby preventing the display position of the virtual image from being changed.

First, the detection unit 35 will be described.

The detection unit 35 detects an angular velocity around a predetermined axis of the head H as movement (detection information) of the head H. According to this, the detection unit 35 can detect a variation in a direction of the head H of the observer. As a result, the control unit 33 can switch the first state to the second state on the basis of the variation in the direction of the head H of the observer.

In addition, it is preferable that the detection unit 35 detect the angular velocities around three axes (for example, an X-axis, a Y-axis, and a Z-axis) of the head H in directions intersecting each other. According to this, it is possible to detect the angular velocity around various axes of the head H.

For example, the detection unit 35 is provided with an angular velocity sensor. In a case of detecting each of the angular velocities around the three axes of the head H in the directions intersecting each other, an angular velocity sensor for three-axes detection may be employed, or three angular velocity sensors of one-axis detection type may be used in combination.

Hereinafter, a method of changing the display position of the virtual image will be described in detail. In addition, hereinafter, as an example, description will be made with respect to a case in which as shown in FIG. 7, the X-axis penetrates the center of the head H, and the head H rotates around the X-axis by an angle θx as an example.

First State

As shown in FIG. 8A, in the first state, a display position of a virtual image G is set to a reference position.

At this time, in the example that is shown, an outside image having outside objects $V_1$ and $V_2$ is visually recognized by the observer while being superimposed on the virtual image G. Here, the object $V_2$ is located at the right side of a region S.

In addition, in this embodiment, the center of a region S capable of displaying the virtual image G is set as the reference position. However, the reference position is not limited to the center of the region S, and for example, may deviate from the center of the region S.

Second State

As shown in FIG. 8B, in the second state, the display position of the virtual image G is changed (moved) from the reference position.

At this time, in the example that is shown, the outside image having the outside objects $V_1$ and $V_2$ is visually recognized by the observer while being superimposed on the virtual image G in such a manner that the object $V_2$ is located at the center of a region S' after rotation around the X-axis of the head H.

In addition, in the second state, the control unit 33 changes the display position of the virtual image G to a position in a direction (in FIG. 8B, a left direction) opposite to that of the movement detected by the detection unit 35. According to this, in the second state, display can be carried out in such a manner that the virtual image G is integrated with the outside image. In addition, when the head is moved, display can be carried out in such a manner that the virtual image G does not block an outside image which the observer desires to visually recognize.

After passage of a predetermined time from the switching from the first state to the second state, as shown in FIG. 8C, the display position of the virtual image G returns to the reference position. That is, the control unit 33 switches the second state to the first state after passage of a predetermined time from the switching from the first state to the second state.

At this time, it is preferable that the control unit 33 switch the second state to the first state in such a manner that the display position of the virtual image G gradually becomes closer to the reference position. According to this, it is possible to reduce discomfort of the observer when changing the display position of the virtual image G from the second state to the first state.

In addition, when switching the second state to the first state by the control unit 33, it is preferable that a movement velocity when the display position of the virtual image G gradually becomes closer to the reference position be proportional to movement detected by the detection unit 35 when the detection unit 35 detects movement larger than the predetermined amount. According to this, it is possible to effectively reduce discomfort of the observer when changing the display position of the virtual image G from the second state to the first state. In this case, for example, as the movement detected by the detection unit 35 becomes faster, the movement velocity when the display position of the virtual image G gradually becomes closer to the reference position is set to be faster. In addition, as the movement detected by the detection unit 35 becomes slower, the movement velocity when the display position of the virtual image G gradually becomes closer to the reference position is set to be slower.

In addition, it is preferable that the predetermined time (a duration for maintaining the second state) be 0.5 seconds or more, and more preferably 0.5 seconds to 2 seconds.

Generally, it is said that a time taken for human beings to visually recognize an object is approximately 0.5 seconds at the shortest. Accordingly, when the second state is maintained for a duration longer than the 0.5 seconds, in the second state, the observer can visually recognize the outside image in a reliable manner. Accordingly, it is possible to realize excellent visibility of the outside image in the second state.

In addition, it is preferable that the predetermined time (a duration for maintaining the second state) be adjustable. According to this, it is possible to provide more excellent convenience to the observer. In this case, for example, it is preferable that the above-described adjustment unit 36 be configured to adjust the predetermined time.

In addition, it is preferable that the control unit 33 carry out the switching from the second state to the first state in such a manner that the display position of the virtual image G gradually becomes closer to the reference position step by step. According to this, it is possible to increase visibility of the outside image during switching from the second state to the first state. In addition, a display time at a position during the returning of the virtual image G to the reference position is arbitrary, and the time may be set to be short in order for the virtual image G to continuously move. In addition, the time may be set to be long in order for the virtual image G to be stopped once during the returning of the virtual image G to the reference position.

Next, a display control method for the image display device 1 (control by the control unit 33) will be described.

First, a positional relationship between the image display device 1 and the virtual image will be described.

In any reference time (for example, an initial state), as shown in FIGS. 9A and 9B, when a world coordinate system is set as (X, Y, Z), and a coordinate (hereinafter, referred to as a "screen coordinate") system in a region S (screen) in which the image display device 1 can display the virtual image G is set as (u, v), the world coordinate system (X, Y, Z) and the screen coordinate system (u, v) are expressed by the following Expression (1).

$$\begin{bmatrix} u \\ v \end{bmatrix} = \begin{bmatrix} f\frac{X}{Z} \\ f\frac{Y}{Z} \end{bmatrix} \quad (1)$$

In addition, in Expression (1), f represents a focal length. In addition, the focal length f is equal to a distance between the eye EY (the point of view of a camera) of the observer and a screen coordinate plane.

Here, since the focal length f becomes equal to the distance (Z in Expression (1)) between the point of view of the observer and the screen coordinate plane, Expression (1) may be modified similar to the following Expression (2).

$$\begin{bmatrix} u \\ v \end{bmatrix} = \begin{bmatrix} X \\ Y \end{bmatrix} \quad (2)$$

When considering rotation of the camera coordinates by an angle θ around the X-axis with respect to the screen coordinates, the world coordinate system after the rotation is set as (X', Y', Z') and the screen coordinate system after the rotation is set as (u', v'), the screen coordinate system (u', v') after the rotation is expressed by the following Expression (3).

$$\begin{bmatrix} u' \\ v' \end{bmatrix} = \begin{bmatrix} X \\ Y' \end{bmatrix} \quad (3)$$

The rotation of the camera coordinate system is rotation around the X-axis, and thus X does not vary and Y' varies alone.

Y' can be calculated using a rotation matrix Rx (θ) in a three-dimensional Euclidean space expressed by the following Expression (4), and is expressed by the following Expression (5).

$$R_x(\theta) = \begin{bmatrix} 1 & 0 & 0 \\ 0 & \cos\theta & -\sin\theta \\ 0 & \sin\theta & \cos\theta \end{bmatrix} \quad (4)$$

$$Y' = Y\cos\theta - Z\sin\theta \quad (5)$$

Accordingly, according to Expression (3) and Expression (5), the screen coordinate system (u', v') after rotation of the camera coordinates is expressed by the following Expression (6).

$$\begin{bmatrix} u' \\ v' \end{bmatrix} = \begin{bmatrix} X \\ Y\cos\theta - Z\sin\theta \end{bmatrix} \quad (6)$$

Next, an example of the display control method for the image display device 1 will be described specifically with reference to FIG. 11.

A First Image Forming Process

First, the display position (u, v) of the virtual image G in the screen coordinates is set to an initial position $P_0$ ($u_0$, $v_0$) that is a reference position (Step S0). According to this, the virtual image G as an image which is visually recognizable to the observer is formed at the reference position (first image forming process). That is, the display position of the virtual image G is set to the first state (initial state).

B Determination Process

Next, a determination process of detecting movement of the head H of the observer by the detection unit 35, and determining whether or not the detected movement is larger than the predetermined amount is carried out (Step S1).

Specifically, determination on whether or not the movement of the head H of the observer is larger than the predetermined amount is carried out on the basis of an angular velocity ω ($ω_x$, $ω_y$, $ω_z$) detected by the detection unit 35.

For example, the magnitude ‖ω‖ of the angular velocity ω and a threshold value $ω_0$ (predetermined amount) that is set in advance are compared to each other to determine whether or not ‖ω‖ is $ω_0$ or more.

In addition, when the magnitude ‖ω‖ of the angular velocity w is equal to or more than the threshold value $ω_0$, it is determined that the movement of the head H of the observer is larger than the predetermined amount, and when the magnitude ‖ω‖ of the angular velocity ω is less than the threshold value $ω_0$, it is determined that the movement of the head H of the observer is equal to or less than the predetermined amount. Here, ‖ω‖ is expressed by the following Expression (7).

$$\|ω\| = \sqrt{ω_x^2 + ω_y^2 + ω_z^2} \quad (7)$$

In addition, in a case where it is determined that the movement of the head H of the observer is larger than the predetermined amount, the process transitions to the subsequent Step S2. On the other hand, in a case where it is determined that the movement of the head H of the observer is equal to or less than the predetermined amount, the process returns to the above-described Step S1.

In this manner, when the sum of the angular velocities around three axes is equal to or more than the threshold value $ω_0$ (predetermined value), the control unit 33 determines that the movement detected by the detection unit 35 is larger than the predetermined amount. Accordingly, it is possible to reliably carry out the determination on whether or not the movement of the head H of the observer is larger than the predetermined amount.

When the angle of view of the region S capable of displaying the virtual image G (refer to FIG. 10) is set as $\theta 0$ [rad], it is preferable that the threshold value $\omega_0$ [rad/sec] satisfy a relationship of $\omega_0 > \theta_0/0.5$. According to this, it is possible to provide excellent convenience to the observer.

C Second Image Forming Process

In Step S2, the display position of the virtual image G is changed on the basis of the movement detected by the detection unit 35. According to this, in a case where it is determined in the B determination process that the movement detected by the detection unit 35 is larger than the predetermined amount, the display position of the virtual image G is changed from the reference position, and the virtual image G is formed (second image forming process). That is, the display position of the virtual image G is set to the second state.

Specifically, in Step S2, first, a position $P_1$ of the virtual image G after changing is obtained on the basis of the angular velocity $\omega$ detected by the detection unit 35.

For example, components of the angular velocity $\omega$ detected by the detection unit 35 become $(\omega_x, 0, 0)$, in the movement of the head H of the observer, only rotation around the X-axis by an angle $-\theta_1$ [rad] is present, and thus the position $P_1$ $(u_1, v_1)$ of the virtual image G after the changing according to Expression (6) is expressed by the following Expression (8).

$$\begin{bmatrix} u_1 \\ v_1 \end{bmatrix} = \begin{bmatrix} X \\ Y\cos\theta_1 - Z\sin\theta_1 \end{bmatrix} \quad (8)$$

Here, the angle $-\theta_1$ can be obtained by using the angular velocity $\omega$ detected by the detection unit and a duration for which the angular velocity $\omega$ is present (by integrating the angular velocity $\omega$).

Provided that, the maximum values of $(u_1, v_1)$ are set in advance. In addition, in a case where the position $P_1$ obtained by Expression (8) exceeds the maximum values, the position $P_1$ is set to the maximum values. According to this, it is possible to prevent the virtual image G from protruding from the screen (region S').

In addition, the minimum values of $(u_1, v_1)$ are set in advance. In addition, in a case where the position $P_1$ obtained by Expression (8) is less than the maximum values, the position $P_1$ is set to the minimum values. According to this, it is possible to prevent or suppress the virtual image G from being located at the central portion of the screen, and thus it is possible to increase visibility of the outside image for the observer.

In this manner, the control unit 33 obtains the rotation angle $-\theta_1$ from the first state of the head H of the observer on the basis of the movement detected by the detection unit 35, and when the rotation angle $-\theta_1$ is equal to or more than a predetermined angle in the second state, the control unit 33 fixes the display position of the virtual image G to an end portion of the region S' capable of displaying the virtual image G. According to this, in the second state, it is possible to obtain excellent visibility of the outside image while allowing the virtual image G to be visually recognized.

As described above, the position $P_1$ is obtained, and the display position of the virtual image is changed to the position $P_1$ that is obtained.

In addition, it is determined whether or not a predetermined time has passed after changing the display position of the virtual image to the position $P_1$ (Step S3). In a case where the predetermined time has not passed, the process returns to Step S2, and in a case where the predetermined time has passed, the process transitions to Step S4.

D Third Image Forming Process (Returning of Display Position to Reference Position)

In Step S4, the display position of the virtual image returns to the initial position $P_0$ $(u_0, v_0)$ from $P_1$ $(u_1, v_1)$. That is, the second state is switched to the first state.

At this time, the display position of the virtual image is moved gradually closer to the initial position $P_0$ $(u_0, v_0)$ from $P_1$ $(u_1, v_1)$ over a predetermined time.

For example, in a case where the predetermined time is set to 1 second and a display frame rate is 10 fps, a unit rotation angle $\Delta\theta$ per one movement step is expressed by the following Expression (9).

$$\Delta\theta = \frac{\theta_1}{T\max} = \frac{\theta_1}{1[\sec] * 10[fps]} = \frac{\theta_1}{10} \quad (9)$$

Provided that, in Expression (9), $T_{max}$ represents the sum of the number of display frames to carry out a process (hereinafter, also simply referred to as a "movement process") of moving the display position of the virtual image from the position $P_1$ to the position $P_0$.

Accordingly, coordinates $P_2$ of the display position of the virtual image that is moved from the position $P_1$ to the position $P_0$ is expressed by the following Expression (10).

$$\begin{bmatrix} u_1 \\ v_1 \end{bmatrix} = \begin{bmatrix} X \\ Y\cos(\theta_1 - \Delta\theta * t) - Z\sin(\theta_1 - \Delta\theta * t) \end{bmatrix} \quad (10)$$

Provided that, in Expression (10), t represents a positive integer indicating the number of steps that have passed and is a value from 1 to $T_{max}$ (in this example, $1 \le t \le 10$).

In the movement process, t increments at an interval of 1000/(display frame rate) [second] (in this example, an interval of 0.1 seconds), and a drawing process of the virtual image is carried out for every increments.

In addition, when t becomes equal to $T_{max}$, that is, when the display position of the virtual image returns to the initial position $P_0$, the movement process is terminated, and it is determined whether or not it is terminated (Step S5). In a case where it is not terminated, the process transitions to Step S0.

According to the image display device 1 and the display control method for the image display device 1 which are described above, when the movement detected by the detection unit 35 is larger than the predetermined amount, the display position of the virtual image is changed. Accordingly, the display position of the virtual image G is changed at a desired time to increase visibility of the outside image, and the display position of the virtual image G is prevented from being changed from the reference position at the other times. As a result, it is possible to provide excellent convenience to the observer.

Second Embodiment

Next, a second embodiment of the invention will be described.

Figure 12A:
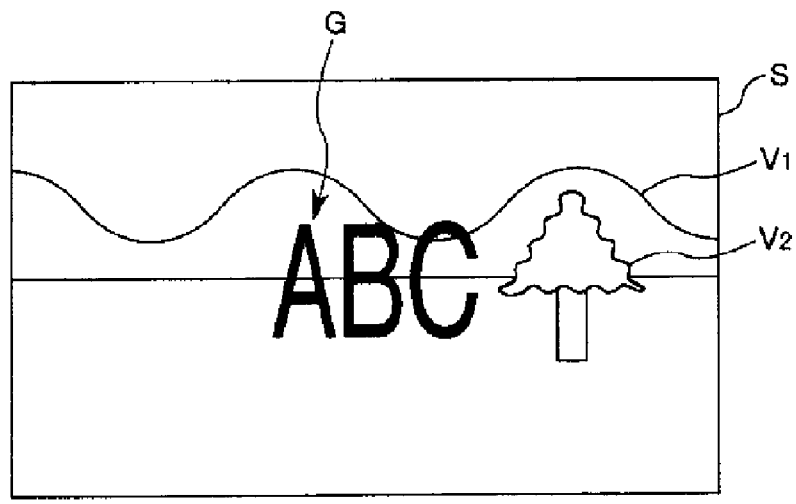
FIGS. 12A to 12C are diagrams illustrating the operation (variation in a display position and a size of a virtual image) of an image display device according to a second embodiment of the invention.
Figure 12B:
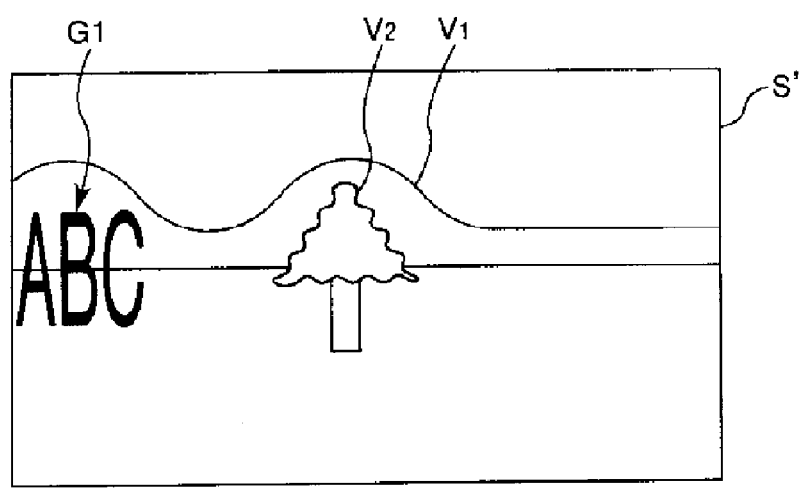
Figure 12C:
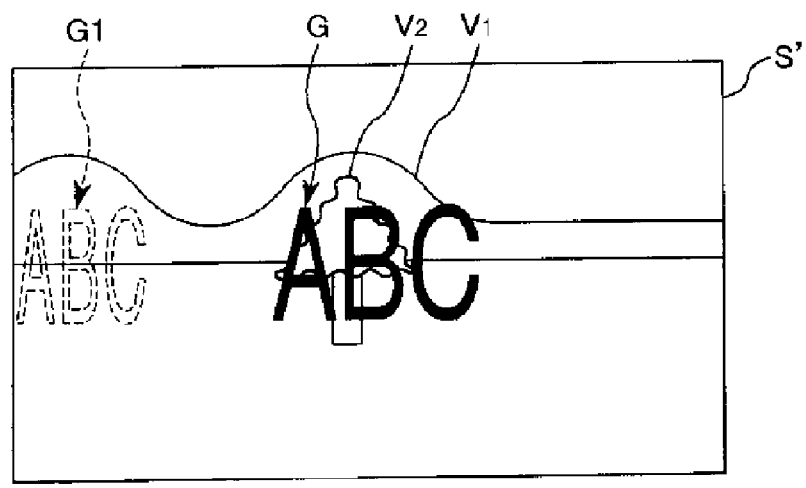

FIGS. 12A to 12C are diagrams illustrating operation (variation in a display position and a size of a virtual image) of an image display device according to the second embodiment of the invention.

Hereinafter, description of the second embodiment will be made on the basis of a difference from the above-described first embodiment, and description of the same portions will not be repeated.

An image display device of this embodiment is the same as the image display device of the above-described first embodiment except that a display method of the virtual image in the second state is different.

In this embodiment, as shown in FIG. 12B, in the second state, the control unit reduces the size of the virtual image G in the first state shown in FIG. 12A at a predetermined compression ratio (size in first state/size in second state) and displays a virtual image G1. According to this, in the second state, it is possible to realize excellent visibility of the outside image while allowing the virtual image G1 to be visually recognizable.

It is preferable that the compression ratio be adjustable. According to this, it is possible to provide more excellent convenience to the observer.

In addition, it is preferable that the control unit change the compression ratio in proportion to the rotation angle of the head from the first state. According to this, it is possible to provide particularly excellent convenience to the observer. In this case, for example, as the rotation angle increases, the compression ratio is set to be larger, and as the rotation angle decreases, the compression ratio is set to be smaller.

In addition, when the angle of view of the region S' capable of displaying the virtual image G1 is set as $\theta_0$ [rad], and the rotation angle of the head of the observer from the first state is set as $\theta_2$, it is preferable that the compression ratio be larger than $\theta_2/\theta_0$. According to this, in the second state, it is possible to realize particularly excellent visibility of the outside image while allowing the virtual image G1 to be visually recognizable.

Hereinafter, the display control method in the image display device of this embodiment will be described in detail.

The display control method of this embodiment includes the following C' second image forming process and D' third image forming process instead of C second image forming process (Step S2 and Step S3) and D third image forming process in the display control method of the above-described first embodiment.

C' Second Image Forming Process (with Reduction Display)

In this process, the display position of the virtual image G is changed on the basis of movement detected by the detection unit 35, and the virtual image G that is displayed is reduced (compressed) as necessary.

Specifically, similar to C second image forming process of the above-described first embodiment, the position $P_1$ ($u_1$, $v_1$) is obtained.

In addition, it is determined whether or not the position $P_1$ is the maximum value. In a case where the position $P_1$ is not the maximum value, similar to C second image forming process of the above-described first embodiment, the display position of the virtual image is changed to the position $P_1$ that is obtained without compressing the virtual image (compression ratio: 100%).

On the other hand, in a case where the position $P_1$ that is obtained is the maximum value, a compression ratio of the virtual image is obtained in accordance with the degree (for example, a rotation angle and an angular velocity around the X-axis) of the movement of the head H of the observer, and the virtual image G1 that is reduced at the compression ratio is displayed at the position P1.

For example, when the rotation angle $\theta_1$ of the head around the X-axis becomes a rotation angle corresponding to the position $P_1$ of the maximum value and then increases by an angle $\theta_2$ for one second, in a case where a display frame rate is 10 fps, a rotation angle per one frame is $\theta_2/10$.

Here, in a case where the number of pixels of the virtual image in a Y'-axis (v' direction) is 100, when the angle of view of a region capable of displaying the virtual image G is set as $\theta_0$ [rad], pixel compression per one frame is expressed by $100 \times \theta_2/(10 \times \theta_0)$.

D' Third Image Forming Process (with Release of Reduction)

Next, the display position of the virtual image returns from $P_1$ ($u_1$, $v_1$) to the initial position $P_0$ ($u_0$, $v_0$), and the reduction of the virtual image is released (the virtual image is enlarged to the original size) as necessary.

According to the above-described second embodiment, when the movement detected by the detection unit 35 is larger than the predetermined amount, the display position of the virtual image is changed. Accordingly, the display position of the virtual image G is changed at a desired time to increase visibility of the outside image, and the display position of the virtual image G is prevented from being changed from the reference position at the other times. As a result, it is possible to provide excellent convenience to the observer.

Hereinbefore, the image display device and the display control method for the image display device according to the invention have been described on the basis of the embodiments, but the invention is not limited thereto. For example, in the image display device according to the invention, the configurations of respective components may be substituted with other configurations having the same function, and other arbitrary configurations may be added.

In addition, in the invention, two or more arbitrary configurations (characteristics) of the respective embodiments may be combined.

In addition, in the above-described embodiments, description has been made with respect to a case in which the invention is applied to the head mount type image display device of an eyeglass type as an example, but the invention is not limited thereto as long as the virtual image is formed as an image that is visually recognized by the observer. For example, the invention is applicable to a head mount type image display device of a helmet type or a headset type, or an image display device in a type supported by the human body such as the neck or shoulder of the observer.

In addition, in the above-described embodiment, description has been made with respect to a case in which the entirety of the image display device is mounted on the head of the observer as an example, but the image display device may include a section that is mounted on the head of the observer, and a section that is portable or mounted on a portion other than the head of the observer. In this case, the detection unit may detect movement of the section (for example, the image forming unit) that is mounted on the head of the observer as movement of the image display device (movement of the head of the observer).

The entire disclosure of Japanese Patent Application No. 2013-025273, filed Feb. 13, 2013 is expressly incorporated by reference herein.

What is claimed is:

1. An image display device that is used by being mounted on the head of an observer, the image display device comprising:
    an image forming unit that forms a virtual image as an image that is visually recognizable to the observer and that has a display area, the display area having a reference position on which the virtual image is displayed;

a detection unit that detects angular velocities around three different axes of the head of the observer in different directions intersecting each other so as to detect movement of the head of the observer; and a control unit that controls the image forming unit on the basis of the movement detected by the detection unit, wherein the reference position is located at or directly adjacent to a center of the display area, a sum of the angular velocities around the three different axes corresponds to a predetermined value, wherein when the movement detected by the detection unit is larger than the predetermined value, the control unit changes a display position of the virtual image in a direction toward a peripheral of the display area from the reference position, and when the predetermined value is set as $\omega_0$ rad/sec and when a view angle of a region capable of displaying the virtual image is set as $\theta_0$ rad, a relationship of $\omega_0 > \theta_0/0.5$ is satisfied.

2. The image display device according to claim 1, wherein the control unit can switch a plurality of states including a first state in which the virtual image is displayed at the reference position and a second state in which the virtual image is displayed at a second state position different from the reference position, determines whether or not the movement detected by the detection unit is larger than the predetermined value, and switches the first state to the second state when it is determined that the movement detected by the detection unit is larger than the predetermined value, and the second state position is located at the peripheral of the display area.

3. The image display device according to claim 2, wherein after passage of a predetermined time from the switching from the first state to the second state, the control unit switches the second state to the first state in such a manner that the display position of the virtual image gradually becomes closer to the reference position from the second state position.

4. The image display device according to claim 3, wherein during the switching from the second state to the first state by the control unit, a movement velocity when the display position of the virtual image gradually becomes closer to the reference position is proportional to the detected movement detected by the detection unit when the detection unit detects that the detected movement is larger than the predetermined value.

5. The image display device according to claim 3, wherein the predetermined time is 0.5 seconds or more.

6. The image display device according to claim 3, wherein the predetermined time is adjustable.

7. The image display device according to claim 3, wherein the control unit carries out the switching from the second state to the first state in such a manner that the display position of the virtual image gradually becomes closer to the reference position step by step.

8. The image display device according to claim 2, wherein in the second state, the control unit displays the virtual image at the second state position that is changed from the reference position in a position-change direction opposite to the movement direction of the movement detected by the detection unit.

9. The image display device according to claim 2, wherein the control unit obtains a rotation angle from the first state of the head of the observer on the basis of the movement detected by the detection unit, and when the rotation angle is equal to or more than a predetermined angle in the second state, the control unit fixes the display position of the virtual image to an end portion of the region capable of displaying the virtual image.

10. The image display device according to claim 9, wherein the control unit reduces a size of the virtual image in the second state with respect to a size of the virtual image in the first state at a predetermined compression ratio.

11. The image display device according to claim 10, wherein the compression ratio is changeable.

12. The image display device according to claim 11, wherein the control unit changes the compression ratio in proportion to the rotation angle.

13. The image display device according to claim 10, wherein when the rotation angle of the head of the observer is set as $\theta_2$, the compression ratio is larger than $\theta_2/\theta_0$.

14. The image display device according to claim 1, wherein the image forming unit includes an optical scanner that allows a movable portion provided with a light reflecting portion having a light reflection property to swing around each of two axes perpendicular to each other.

15. An image display device, comprising:

an image forming unit that forms a virtual image as an image that is visually recognizable to an observer and that has a display area, the display area having a reference position on which the virtual image is displayed;

a detection unit that detects angular velocities around three different axes of a head of the observer in different directions intersecting each other so as to detect movement of the head of the observer; and a control unit that controls the image forming unit on the basis of the movement detected by the detection unit, wherein the reference position is located at or directly adjacent to a center of the display area, a sum of the angular velocities around the three different axes corresponds to a redetermined value, wherein when the movement that is detected by the detection unit is larger than the predetermined value, the control unit changes a display position of the virtual image in a direction toward a peripheral of the display area from the reference position, and when the predetermined value is set as $\omega_0$ rad/sec and when a view angle of a region capable of displaying the virtual image is set as $\theta_0$ rad, a relationship of $\omega_0 > \theta_0/0.5$ is satisfied.

16. A display control method for an image display device, the display control method comprising:

forming a virtual image as an image that is visually recognizable to an observer at a reference position in a display area, the reference position being located at or directly adjacent to a center of the display area;

detecting angular velocities around three different axes of a head of the observer in different directions intersecting each other so as to detect movement of the head of the observer;

calculating a sum of the angular velocities around the three different axes, the sum corresponding to a predetermined value;

determining whether or not the detected movement is larger than the predetermined value; and forming the virtual image in a new position after changing a display position of the virtual image to the new position that is located in a direction toward a peripheral of the display area from the reference position when it is determined that the detected movement is larger than the predetermined value, wherein when the predetermined value is set as $\omega_0$ rad/sec and when a view angle of a region capable of displaying the virtual image is set as $\theta_0$ rad, a relationship of $\omega_0 > \theta_0/0.5$ is satisfied.

17. An image display device that is used by being mounted on a head of an observer, the image display device comprising:

an image forming unit that forms a virtual image as an image that is visually recognizable to the observer;

a detector that detects angular velocities around three different axes of the head of the observer in different directions intersecting each other so as to detect movement of the head of the observer; and a controller that is configured to control the image forming unit so as to select one of a plurality of display states based on the movement detected by the detector, the plurality of display states including a first display state in which the virtual image is displayed at a reference position and a second display state in which the virtual image is displayed at a second state position different from the reference position, wherein a sum of the angular velocities around the three different axes corresponds to a predetermined value, when the movement detected by the detector is larger than the predetermined value, the controller selects the second display state so that the virtual image is displayed at the second state position which is located in a position-change direction opposite to a movement direction of the movement detected by the detector, after a predetermined time has passed from a time in which the controller selects the second display state, the controller selects the first display state so that the virtual image is displayed at the reference position, and when the predetermined value is set as $\omega_0$ rad/sec and when a view angle of a region capable of displaying the virtual image is set as $\theta_0$ rad, a relationship of $\omega_0 > \theta_0/0.5$ is satisfied.

* * * * *